US012800599B2

(12) United States Patent
Remes

(10) Patent No.: US 12,800,599 B2
(45) Date of Patent: Nov. 17, 2026

(54) ACQUISITION SCHEDULING AND LOAD BALANCING FOR TARGETED MASS SPECTROMETRY

(71) Applicant: Thermo Finnigan LLC, San Jose, CA (US)

(72) Inventor: Philip M. Remes, Livermore, CA (US)

(73) Assignee: Thermo Finnigan LLC, San Jose, CA (US)

( * ) Notice: Subject to any disclaimer, the term of this patent is extended or adjusted under 35 U.S.C. 154(b) by 260 days.

(21) Appl. No.: 18/668,638

(22) Filed: May 20, 2024

(65) Prior Publication Data

US 2024/0402201 A1 Dec. 5, 2024

Related U.S. Application Data

(60) Provisional application No. 63/470,242, filed on Jun. 1, 2023.

(51) Int. Cl.
*G01N 35/00* (2006.01)
*B01D 15/08* (2006.01)
(Continued)

(52) U.S. Cl.
CPC ......... *G01N 35/0092* (2013.01); *B01D 15/08* (2013.01); *G01N 30/14* (2013.01); *G01N 30/7233* (2013.01); *G01N 2030/027* (2013.01)

(58) Field of Classification Search
CPC ............... G01N 35/0092; G01N 30/14; G01N 30/7233; G01N 2030/027; G01N 30/8651; G01N 27/62; G01N 30/02; G01N 30/72; G01N 30/86; B01D 15/08; H01J 49/0031; G16C 20/20; G16C 20/70
See application file for complete search history.

(56) References Cited

U.S. PATENT DOCUMENTS

| | | | | |
|---|---|---|---|---|
| 11,011,359 B2 | 5/2021 | Geromanos et al. | | |
| 2023/0108254 A1* | 4/2023 | Remes | ................ | H01J 49/0027 250/282 |

FOREIGN PATENT DOCUMENTS

| | | | |
|---|---|---|---|
| EP | 4199037 A2 | 6/2023 | |

OTHER PUBLICATIONS

Remes, et al, "Highly Multiplex Targeted Proteomics Enabled by Real-Time Chromatographic Alignment". Anal Chem. Sep. 1, 2020; 92(17): 11809-11817. doi:10.1021/acs.analchem.0c02075.

(Continued)

*Primary Examiner* — Tarun Sinha

(57) ABSTRACT

A computing device for mass spectrometry generates an acquisition schedule that schedules acquisition, by a mass spectrometer, of a set of mass spectra for each target analyte included in a plurality of target analytes included in a sample as the plurality of target analytes elute from a separation system. The acquisition schedule specifies a dynamic acquisition cycle period that varies over time. The computing device further directs the mass spectrometer to acquire the mass spectra in accordance with the acquisition schedule. In some examples, an acquisition schedule is generated by identifying an analyte group corresponding to each analyte included in a list of analytes estimated to be present in the sample and selecting, from the list of analytes, the set of target analytes based on selection criteria and the analyte group corresponding to each respective analyte included in the list of analytes.

18 Claims, 18 Drawing Sheets

(51) Int. Cl.
*G01N 30/14* (2006.01)
*G01N 30/72* (2006.01)
*G01N 30/02* (2006.01)

(56) References Cited

OTHER PUBLICATIONS

Extended European Search Report received in EP Application No. 24177739 on Oct. 21, 2024.

* cited by examiner

1600

ACQUISITION SCHEDULING AND LOAD BALANCING FOR TARGETED MASS SPECTROMETRY

RELATED APPLICATIONS

The present application claims priority to U.S. Provisional Patent Application No. 63/470,242, filed Jun. 1, 2023, which is hereby incorporated by reference in its entirety.

BACKGROUND INFORMATION

A mass spectrometer may be used to detect, identify, and/or quantify molecules based on the mass-to-charge ratio (m/z) of ions produced from the molecules. A mass spectrometer generally includes an ion source for producing ions from molecules included in a sample, a mass analyzer for separating the ions based on their m/z, and an ion detector for detecting the separated ions. The mass spectrometer may include or be connected to a computer-based software platform that uses data from the ion detector to construct a mass spectrum that shows a relative abundance of each of the detected ions as a function of m/z. The mass spectrum may be used to detect and quantify molecules in simple and complex mixtures. In some configurations, a separation system, such as a liquid chromatograph (LC), gas chromatograph (GC), or capillary electrophoresis (CE) system, is coupled to the mass spectrometer in a combined system (e.g., LC-MS, GC-MS, or CE-MS system) to separate analytes in the sample before the analytes are introduced to the mass spectrometer.

One application of mass spectrometry is the identification, quantification, and structural elucidation of peptides, proteins, and related molecules in complex biological samples. In some such experiments, often referred to as multi-stage mass spectrometry (MSn where n is 2 or more) or tandem mass spectrometry (MS/MS or MS2 (n=2)), certain ions (referred to as precursor ions) are isolated and fragmented in a controlled manner to yield product ions. A mass analysis is then performed on the product ions to generate mass spectra of the product ions. The mass spectra of the product ions provide information that may be used to confirm identification, determine quantity, and/or derive structural details regarding analytes of interest.

Various techniques may be used to acquire mass spectra using multi-stage mass spectrometry or tandem mass spectrometry. One commonly used technique is data-dependent acquisition (DDA), which uses data acquired in one mass analysis to select, based on predetermined criteria, one or more ion species or a narrow m/z range for isolation and fragmentation. For example, the mass spectrometer may perform a full MS survey scan of precursor ions over a wide precursor m/z range and select, based on the MS survey scan, one or more precursor ion species from the resulting mass spectra for isolation, fragmentation, and mass analysis. The criteria for selection of precursor ion species may include, for example, intensity, charge state, m/z, inclusion/exclusion lists, or isotopic patterns. The main disadvantage of the DDA technique is the inherently random nature of the results. When technical replicates of the same sample or comparative analysis on other samples is performed, some analytes may be measured in one experiment but not in others. This frustrates attempts to perform reproducible analyses and is known as the "missing value problem".

In contrast to DDA, data-independent acquisition (DIA) is a technique in which all precursor ion species within a wide precursor m/z range (e.g., 500-900 m/z) are isolated and fragmented via a sequentially advancing isolation window of a fixed m/z width (e.g., 20 m/z) to generate product ions. A mass analysis is then performed on the product ions in a methodical and unbiased manner. The isolation of precursor ions across the full precursor m/z range, fragmentation of the isolated precursor ions, and mass analysis of the product ions constitutes one acquisition cycle, which is repeated to generate mass spectra of the product ions. In the DIA technique, isolation and fragmentation of one or more precursor ion species is not dependent on data acquired in a survey mass analysis, as in DDA, and is much more suitable for comparing results across different samples than DDA because the DIA technique does not suffer from the missing values problem.

In contrast to DDA and DIA, targeted mass spectrometry is a technique in which a mass analysis is performed for a fixed, known list of analytes included in a sample. Targeted mass spectrometry experiments are designed to gather quantitative information about a set of analytes, the identity of which are known before the experiment starts. Generally, the sample is introduced to the separation system (e.g., an LC system), which separates analytes and introduces the analytes to the mass spectrometer as the analytes elute from the separation system. Given some knowledge about the analytes' expected elution times from the separation system, an acquisition schedule can be created that specifies which analytes the mass spectrometer will target for mass analysis at which time during the experiment. Analytes that are part of such targeted assays are often referred to as "targets" or "target analytes". During the experiment, when the elapsed time is a value between a target's elution start and stop times, the target is said to be "active". This helps utilize the instrument resources more efficiently than if mass spectra were acquired continuously for every target in the assay.

Targeted mass spectrometry comes in many forms, such as selected reaction monitoring (SRM), multiple reaction monitoring (MRM), and parallel reaction monitoring (PRM). Targeted mass spectrometry is advantageous because of the high data quality that can be produced when the instrument is dedicated to the analysis of a smaller group of target analytes, each with a narrow or even customized precursor isolation window. Targeted mass spectrometry produces results with low limits of detection and high dynamic range. However, the throughput of the targeted mass spectrometry analysis is more limited than in techniques like DIA in which the isolation window is broad enough to multiplex multiple precursor ions. However, there is room to improve acquisition scheduling and throughput for targeted mass spectrometry experiments.

SUMMARY

The following description presents a simplified summary of one or more aspects of the methods and systems described herein to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a non-transitory computer-readable medium stores instructions that, when executed, direct at least one processor of a computing device for mass spectrometry to: generate an acquisition schedule that schedules acquisition, by a mass spectrometer, of a set of mass spectra for each target analyte included in a plurality of target analytes included in a sample as the plurality of target analytes elute from a separation system, wherein the acquisition schedule specifies a dynamic acquisition cycle period that varies over time; and direct the mass spectrometer to acquire the mass spectra in accordance with the acquisition schedule.

In some illustrative examples, a non-transitory computer-readable medium stores instructions that, when executed, direct at least one processor of a computing device for mass spectrometry to perform a process including: generating, for a targeted assay of a sample, an acquisition schedule that schedules acquisition, by a mass spectrometer, of a set of mass spectra for each target analyte included in a set of target analytes included in a sample as each target analyte elutes from a separation system, wherein generating the acquisition schedule includes: identifying an analyte group corresponding to each analyte included in a list of analytes estimated to be present in the sample; and selecting, from the list of analytes, the set of target analytes based on selection criteria and the analyte group corresponding to each respective analyte included in the list of analytes; and directing the mass spectrometer to acquire the mass spectra in accordance with the acquisition schedule.

In some illustrative examples, a system for targeted mass spectrometry, includes: a separation system configured to separate a plurality of target analytes included in a sample; a mass spectrometer coupled to the separation system and configured to acquire mass spectra for a set of target analytes included in the plurality of target analytes as the plurality of target analytes elute from the separation system; and a controller configured to: generate an acquisition schedule that schedules acquisition, by the mass spectrometer, of a set of mass spectra for each target analyte included in the set of target analytes, wherein the acquisition schedule specifies a dynamic acquisition cycle period that varies over time; and direct the mass spectrometer to acquire the set of mass spectra for the set of target analytes in accordance with the acquisition schedule.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for performing targeted mass spectrometry with improved acquisition scheduling are described herein. In some examples, targeted mass spectra are acquired using a dynamic acquisition cycle period (e.g., a time-dependent or time-varying sampling rate) that is based on the time-varying elution peak width of the active targets over the course of an experiment. Compared to a constant acquisition cycle period, a dynamic acquisition cycle period ensures better quantitative accuracy of elution peak areas for peaks that would have been under-sampled, and higher throughput or limits of quantitation in regions of the experiment for peaks that would have been over-sampled.

In further examples, a method for building an acquisition schedule for a targeted assay uses load balancing to account for both the speed of the mass spectrometer and priorities to include analytes (e.g., peptides or molecules) that will give good quantitative and informative results and that cover as broad a range of analyte groups (e.g., proteins or molecule groups) as possible. This makes building targeted assays easier as compared with conventional methods and provides a clear-cut methodology for pruning a prospective list of targets.

Various examples will now be described in more detail with reference to the figures. The systems and methods described herein may provide one or more of the benefits mentioned above and/or various additional and/or alternative benefits that will be made apparent herein.

Targeted mass spectrometry with improved acquisition scheduling and load balancing for improved throughput is performed with a combined separation-mass spectrometry system, such as an LC-MS system. As such, an LC-MS system will now be described. The described LC-MS system is illustrative and not limiting. The methods and systems described herein may operate as part of or in conjunction with the LC-MS system described herein and/or with any other suitable separation-mass spectrometry system, such as a high-performance liquid chromatography-mass spectrometry (HPLC-MS) system, a gas chromatography-mass spectrometry (GC-MS) system, or a capillary electrophoresis-mass spectrometry (CE-MS) system. The methods and systems described herein may also operate in conjunction with any other continuous flow sample source, such as a flow-injection mass spectrometry system (FI-MS) in which analytes are injected into a mobile phase (without separation in a column) and enter the mass spectrometer with time-dependent variations in intensity (e.g., Gaussian-like peaks).

Figure 1:
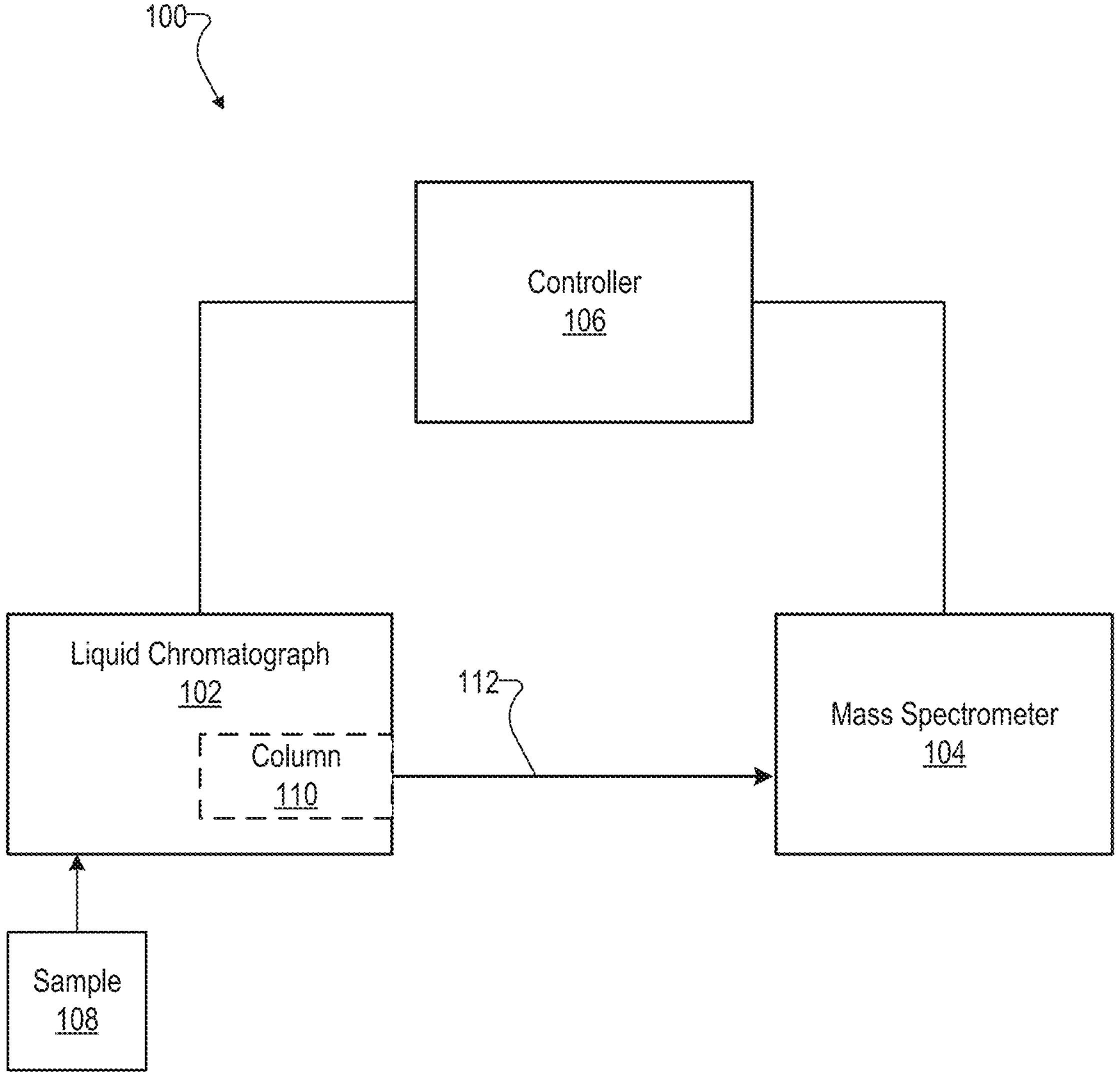
FIG. 1 shows a functional diagram of an illustrative LC-MS system.

FIG. 1 shows a functional diagram of an illustrative LC-MS system 100. LC-MS system 100 includes a liquid chromatograph 102, a mass spectrometer 104, and a controller 106. Liquid chromatograph 102 is configured to separate, over time, analytes within a sample 108 that is injected into liquid chromatograph 102. Sample 108 may include, for example, chemical analytes (e.g., molecules, ions, etc.) and/or biological analytes (e.g., metabolites, proteins, peptides, lipids, etc.) for detection and analysis by LC-MS system 100. Liquid chromatograph 102 may be implemented by any liquid chromatograph as may suit a particular implementation. In liquid chromatograph 102, sample 108 is injected into a mobile phase (e.g., a solvent), which carries sample 108 through a column 110 containing a stationary phase (e.g., an adsorbent packing material). As the mobile phase passes through column 110, analytes within sample 108 elute from column 110 at different times based on, for example, their size, affinity to the stationary phase, polarity, and/or hydrophobicity.

A detector (e.g., an ion detector component of mass spectrometer 104, an ion-electron converter and electron multiplier, etc.) may measure the relative intensity of a signal modulated by separated analytes in eluate 112 from column 110. Data generated by the detector may be represented as a chromatogram, which plots retention time on the x-axis and a signal representative of the relative intensity on the y-axis. The retention time of an analyte is generally measured as the period of time between injection of sample 108 into the mobile phase and the relative intensity peak maximum after chromatographic separation. In some examples, the relative intensity may be correlated to or representative of relative abundance of the separated analytes. Data generated by liquid chromatograph 102 is output to controller 106.

In some cases, particularly in analyses of complex mixtures, multiple different analytes in sample 108 co-elute from column 110 at approximately the same time, and thus may have the same or similar retention times. As a result, determination of the relative intensity of the individual analytes within sample 108 requires further separation of signals attributable to the individual analytes. To this end, liquid chromatograph 102 directs analytes included in eluate 112 to mass spectrometer 104 for further separation, identification, and/or quantification of the analytes.

Mass spectrometer 104 produces ions from the analytes received from liquid chromatograph 102 and sorts or separates the produced ions based on m/z of the ions. Mass spectrometer 104 may be implemented by a multi-stage mass spectrometer configured to perform multi-stage mass spectrometry (also denoted MSn where n is 2 or more) or a tandem mass spectrometer configured to perform tandem mass spectrometry (a form of multi-stage mass spectrometry denoted MS/MS or MS2 (where n is 2)). A detector in mass spectrometer 104 measures the intensity of the signal produced by the ions. As used herein, "intensity" or "signal intensity" refers to the response of the detector and may represent absolute abundance, relative abundance, ion count, intensity, relative intensity, ion current, or any other suitable measure of ion detection. Data acquired by mass spectrometer 104 is output to controller 106. Data generated by the detector may be represented by mass spectra, which plot the intensity of the observed signal as a function of m/z of the detected ions.

Figure 2:
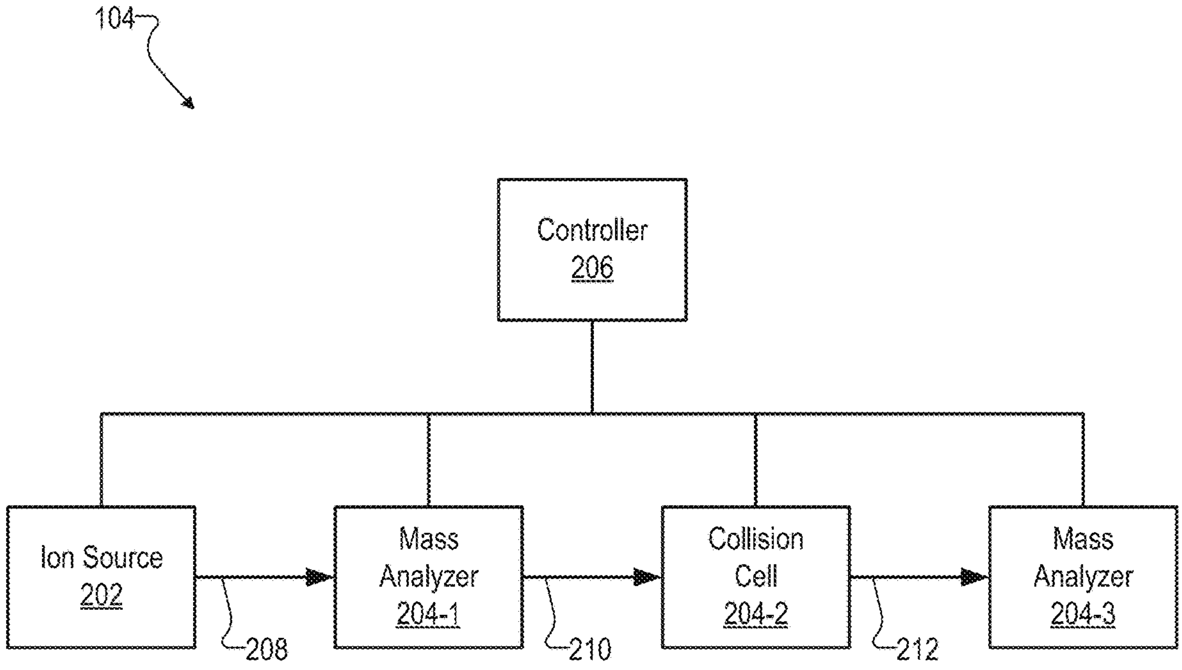
FIG. 2 shows a functional diagram of an illustrative implementation of a mass spectrometer included in the LC-MS system of FIG. 1.

FIG. 2 shows a functional diagram of an illustrative implementation of mass spectrometer 104. Mass spectrometer 104 includes an ion source 202, a first mass analyzer 204-1, a collision cell 204-2, a second mass analyzer 204-3, and a controller 206. Mass spectrometer 104 may further include any additional or alternative components not shown as may suit a particular implementation (e.g., ion optics, filters, ion stores, an autosampler, a detector, etc.).

Ion source 202 produces a stream 208 of ions from the analytes received from column 110 and deliver the ions to first mass analyzer 204-1. Ion source 202 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 202 may include various components for producing ions from analytes included in sample 108 and delivering the ions to first mass analyzer 204-1.

First mass analyzer 204-1 receives ion stream 208, isolates precursor ions of a selected m/z range, and delivers a beam 210 of the precursor ions to collision cell 204-2. Collision cell 204-2 receives beam 210 of precursor ions and produces product ions (e.g., fragment ions) via controlled dissociation processes. Collision cell 204-2 directs a beam 212 of product ions to second mass analyzer 204-3. Second mass analyzer 204-3 filters and/or performs a mass analysis of the product ions.

Mass analyzers 204-1 and 204-3 isolate or separate ions according to m/z of each of the ions. Mass analyzers 204-1 and 204-3 may be implemented by any suitable mass analyzer, such as a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, and the like. Mass analyzers 204-1 and 204-3 need not be implemented by the same type of mass analyzer.

Collision cell 204-2 may be implemented by any suitable collision cell. As used herein, "collision cell" may encompass any structure or device configured to produce product ions via controlled dissociation processes and is not limited to devices employed for collisionally-activated dissociation. For example, collision cell 204-2 may be configured to fragment precursor ions using collision induced dissociation, electron transfer dissociation, electron capture dissociation, photo induced dissociation, surface induced dissociation, ion/molecule reactions, and the like.

An ion detector (not shown) detects ions at each of a variety of different m/z and responsively generates an electrical signal representative of ion intensity. The electrical signal is transmitted to controller 206 for processing, such as to construct a mass spectrum of the analyzed ions. For example, mass analyzer 204-3 may emit an emission beam of separated ions to the ion detector, which is configured to detect the ions in the emission beam and generate or provide data that can be used by controller 206 to construct a mass spectrum. The ion detector may be implemented by any suitable detection device, including without limitation an electron multiplier, a Faraday cup, and the like. In other examples, such as when second mass analyzer 204-3 is implemented by an orbital electrostatic trap mass analyzer, second mass analyzer 204-3 functions as both a mass analyzer and a detector.

Controller 206 is communicatively coupled with, and configured to control operations of, mass spectrometer 104. For example, controller 206 may be configured to control operation of various hardware components included in ion source 202 and/or mass analyzers 204-1 and 204-3. To illustrate, controller 206 may be configured to control an accumulation time of ion source 202 and/or mass analyzers 204, control an oscillatory voltage power supply and/or a DC power supply to supply an RF voltage and/or a DC voltage to mass analyzers 204, adjust values of the RF voltage and DC voltage to select an effective m/z (including a mass tolerance window) for analysis, and adjust the sensitivity of the ion detector (e.g., by adjusting the detector gain).

Controller 206 may include any suitable hardware (e.g., a processor, circuitry, etc.) and/or software as may serve a particular implementation. While FIG. 2 shows that controller 206 is included in mass spectrometer 104, controller 206 may alternatively be implemented in whole or in part separately from mass spectrometer 104, such as by a computing device communicatively coupled to mass spectrometer 104 by way of a wired connection (e.g., a cable) and/or a network (e.g., a local area network, a wireless network (e.g., Wi-Fi), a wide area network, the Internet, a cellular data network, etc.). In some examples, controller 206 is implemented in whole or in part by controller 106.

In the example of FIG. 2, mass spectrometer 104 is tandem-in-space (e.g., has multiple mass analyzers) and has two stages for performing tandem mass spectrometry. However, mass spectrometer 104 is not limited to this configuration but may have any other suitable configuration. For example, mass spectrometer 104 may be tandem-in-time. Additionally or alternatively, mass spectrometer 104 may be a multi-stage mass spectrometer and may have any suitable number of mass analyzers and stages (e.g., three or more) for performing multi-stage tandem mass spectrometry (e.g., MS/MS/MS).

Referring again to FIG. 1, controller 106 is communicatively coupled with, and configured to control operations of, LC-MS system 100 (e.g., liquid chromatograph 102 and mass spectrometer 104). Controller 106 may include any suitable hardware (e.g., a processor, circuitry, etc.) and/or software configured to control operations of and/or interface with the various components of LC-MS system 100 (e.g., liquid chromatography 102 or mass spectrometer 104).

Controller 106 and/or controller 206 may also include and/or provide a user interface configured to enable user interaction with LC-MS system 100 or mass spectrometer 104. The user may interact with controller 106 and/or controller 206 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 106 and/or controller 206. In other examples, the display device and/or input device may be separate from, but communicatively coupled to, controller 106 and/or controller 206. For instance, the display device and the input device may be included in a computer (e.g., a desktop computer, a laptop computer, etc.) communicatively connected to controller 106 and/or controller 206 by way of a wired connection (e.g., by one or more cables) and/or a wireless connection.

Controller 106 acquires data acquired over time by LC-MS system 100. The data may include a series of mass spectra including intensity values of ions produced from the analytes of sample 108 as a function of m/z of the ions. The series of mass spectra may be represented in a three-dimensional map in which elution time (e.g., retention time) is plotted along an X-axis of the map, m/z is plotted along a Y-axis of the map, and intensity is plotted along a Z-axis of the map. Spectral features on the map (e.g., Z-axis peaks of intensity) represent detection by LC-MS system 100 of ions produced from various analytes included in sample 108. The X-axis and Z-axis of the map may be used to generate an elution profile (e.g., a mass chromatogram) that plots detected intensity as a function of time for a selected m/z.

As used herein, a "selected m/z" refers to a specific m/z, with or without a mass tolerance window (e.g., +/−0.5 m/z), or a narrow range of m/z (e.g., an isolation window with a width or range such as 20 m/z, 10 m/z, 4 m/z, 3 m/z, etc.). In a targeted MS2 or MSn analysis, such as a selected reaction monitoring (SRM) analysis, a multiple reaction monitoring (MRM) analysis, or a parallel reaction monitoring (PRM) analysis, the selected m/z corresponds to the m/z of the product ion of a distinct transition (precursor ion/product ion pair), and the recorded intensity as a function of time vector (e.g., trace) represents the elution profile for the distinct transition. The Y-axis and Z-axis of the map may be used to generate mass spectra, each mass spectrum plotting intensity as a function of m/z for a particular acquisition.

As mentioned, targeted mass spectrometry experiments are designed to gather quantitative information about a set of analytes, the identity of which are known before the experiment starts. The quantity of an analyte may be determined by integrating the area under its elution peak. In some examples, quantitation of the analyte includes summing the detected signal for multiple different selected m/z for product ions that are characteristic of the analyte of interest and integrating the area under the summed signal. For example, an analyte of interest may have multiple characteristic transitions, each of which may be summed to form an elution profile with an increased signal to noise ratio. Thus, as used herein, "selected m/z" may also be a combination of multiple distinct m/z or m/z ranges. For example, the selected m/z for an analyte of interest may be the combination of multiple distinct m/z or m/z ranges for each ion characteristic of the analyte of interest, and the elution profile for the selected m/z may be the summed signal of each distinct m/z or m/z range. In further examples, the multiple distinct m/z or m/z ranges span the full m/z spectrum, wherein the elution profile is a total ion current (TIC).

As used herein, an "acquisition" refers to a mass analysis performed at a discrete point in time to acquire a single mass spectrum across an m/z range of interest (e.g., a selected m/z). It will be recognized that, in some targeted MS2 analyses, true "spectra" are not acquired in that the detected intensity as a function of time is acquired or recorded for only a selected m/z and not for a broad m/z spectrum. Nevertheless, for ease of discussion herein, the recorded intensity vs. time vector for such targeted MS2 analyses is referred to herein as a mass spectrum.

Figure 3A:
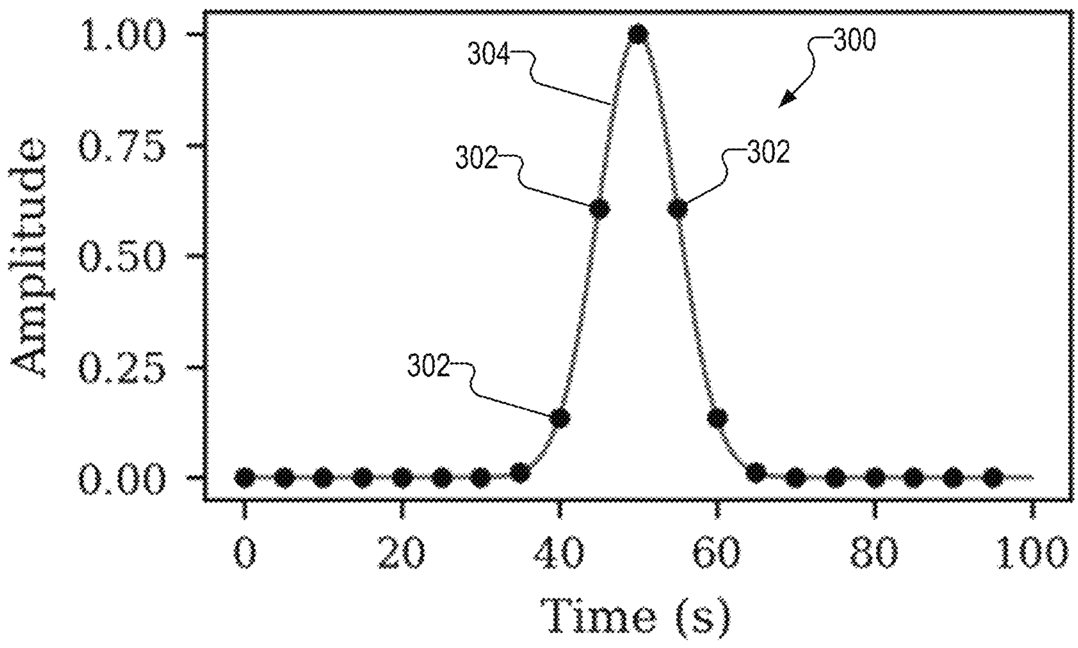
FIG. 3A shows a portion of an illustrative elution profile of a selected m/z.
Figure 3B:
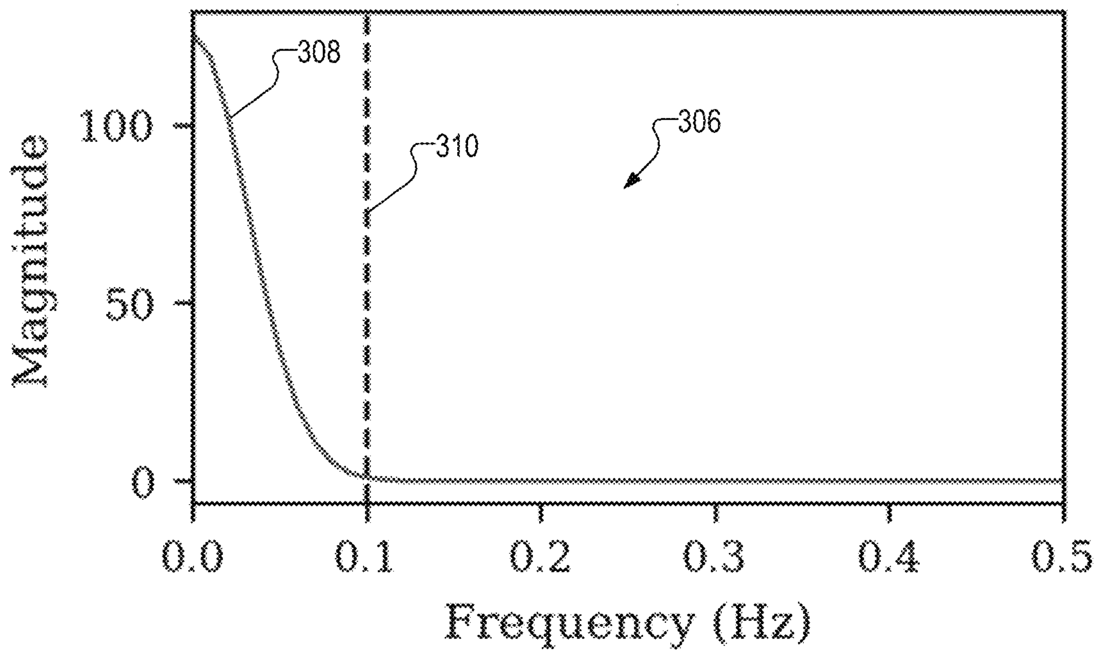
FIG. 3B shows a frequency domain representation of the elution profile of FIG. 3A.

The sampling rate of an elution profile for a selected m/z will now be described with reference to FIGS. 3A and 3B. FIG. 3A shows a portion of an illustrative elution profile 300 (indicated by the solid line curve) of a selected m/z. Elution profile 300 is generated from data acquired by the mass spectrometer, such as a plurality of MS2 acquisitions. Elution profile 300 plots intensity amplitude (arbitrary units) as a function of time. Time is generally measured beginning from injection of the sample to the separation system. For chromatographic separation applications, an analyte's elution time refers to retention time, which is generally measured as the period of time between injection of the sample into the mobile phase and the relative intensity peak maximum after chromatographic separation. For capillary electrophoresis applications, in which analytes are not retained but instead continuously migrate, an analyte's elution time refers to migration time. Migration time is generally measured as the period of time taken for an analyte to migrate from the beginning of the capillary to a detection location. For ion mobility separations, an analyte's elution time refers to drift time of the analyte through a buffer gas, which may take place either in-space (e.g. a drift tube) or in-time (e.g. a trapped ion mobility cell).

As shown in FIG. 3A, elution profile 300 includes a plurality of acquisition points 302, each obtained by a distinct acquisition. As analytes elute, the detected intensity of ions produced from the analytes form an elution peak 304 having a roughly Gaussian profile. However, elution peak 304 and/or other elution peaks (not shown) in elution profile 300 may have other, non-Gaussian profiles.

As used herein, "sampling rate" is the number of acquisitions per unit of time for a selected m/z. In the example of FIG. 3A, the sampling rate is approximately 0.2 Hz (4 acquisitions every 20 seconds). The sampling rate may also be expressed as the number of acquisitions per elution peak. An elution peak may be defined as any detected signal above a threshold value (e.g., 5% or 10% above a baseline signal). In FIG. 3A, elution peak 304 spans a period of about 30 seconds (e.g., from 35 seconds to 65 seconds). Thus, the sampling rate of FIG. 3A may be expressed as six acquisitions per peak.

As used herein, "acquisition cycle period" or "sampling period" is the duration of time between sequential acquisitions (e.g., between sequential acquisition points 302) in the elution profile of a selected m/z. In the example of FIG. 3A, the sampling period is approximately 5 seconds. During a sampling period, a mass analysis (e.g., an acquisition) is performed for each of multiple different selected m/z, generally each with the same sampling rate. Accordingly, multiple acquisitions are performed, each for a distinct selected m/z (e.g., a distinct target analyte), during one sampling period, and this is referred to as an acquisition cycle. The acquisition cycle is repeated multiple times to generate an elution profile for each distinct selected m/z.

As used herein, "instrument speed" or "acquisition rate" refers to the amount of time the mass spectrometer requires to perform one acquisition for a selected m/z. The instrument speed is generally based on characteristics and parameters of the mass spectrometer, such as mass analysis time and ion injection time and/or dwell time. The instrument speed and the acquisition cycle period determine the number of target analytes or distinct selected m/z that may be analyzed during an acquisition cycle and, hence, over the course of an experiment.

Many experiments have a sampling rate requirement. As used herein, "sampling rate requirement" refers to the minimum number of acquisitions per unit of time for each selected m/z or the minimum number of acquisitions across each elution peak, as required by method parameters for a particular experiment being performed. The sampling rate requirement may be informed by, but is not necessarily the same as, the Nyquist limit. In some examples, the Nyquist limit is determined based on a frequency domain representation of the elution profile of the selected m/z. FIG. 3B shows a frequency domain representation 306 of elution profile 300. FIG. 3B may be generated from elution profile 300 in any suitable way, such as by performing a Fourier transform on elution profile 300. Frequency domain representation 306 includes a peak 308 corresponding to elution peak 304. Based on peak 308, one may determine that the highest frequency to digitally recover is 0.1 Hz, as indicated by dashed line 310. Accordingly, the Nyquist limit would be 0.2 Hz (e.g., twice the highest frequency), giving a sampling period of 5 seconds and a sampling rate of 6 acquisitions across elution peak 304. A sampling rate that matches or exceeds the Nyquist limit is presumed to generate data with sufficient precision to accurately determine peak intensity and peak area and, hence, to accurately quantitate the target analyte. It will be recognized that the Nyquist limit may be determined in other ways, and the sampling rate requirement may be different (e.g., greater than or less than) the Nyquist limit. For example, the sampling rate requirement for a particular method may be determined experimentally.

For most experiments, the sampling rate requirement is at least six acquisitions per elution peak, and in many experiments is a value between six and fifteen acquisitions per elution peak. In some examples, such as for Gaussian-shaped elution profiles, the sampling rate requirement is five acquisitions per peak. In other examples, the sampling rate requirement is six acquisitions per peak. In further examples, the sampling rate requirement is eight acquisitions per peak. In yet further examples, the sampling rate requirement is ten acquisitions per peak. As explained above, the sampling rate may also be expressed as acquisitions per unit time. Accordingly, in some examples, the sampling rate requirement is 0.25 Hz or higher. In further examples, the sampling rate requirement is 0.30 Hz or higher. In yet further examples, the sampling rate requirement is 0.40 Hz or higher. In even further examples, the sampling rate requirement is 0.50 Hz or higher.

For targeted mass spectrometry experiments, the acquisition cycle period is traditionally determined based on the average elution peak width over the course of the experiment and the sampling rate requirement for the experiment. Traditionally, a user specifies the length of the acquisition cycle period in an effort to acquire a predetermined number of mass spectra during the elution of each target (e.g., to satisfy the sampling rate requirement). For example, the user may know that, on average, the elution peaks of the active targets are 8 seconds wide at the base and the sampling rate requirement to adequately characterize each peak is 8 sample points per peak. In this case, an acquisition cycle period of 1 second would be needed. This practice works well enough if the elution peaks are fairly uniform in width, but there may be a distribution of elution peak widths for the targets in an assay. The variation of elution peak widths during a targeted experiment occurs with all separation techniques but is particularly pronounced for CE-MS.

Figure 4:
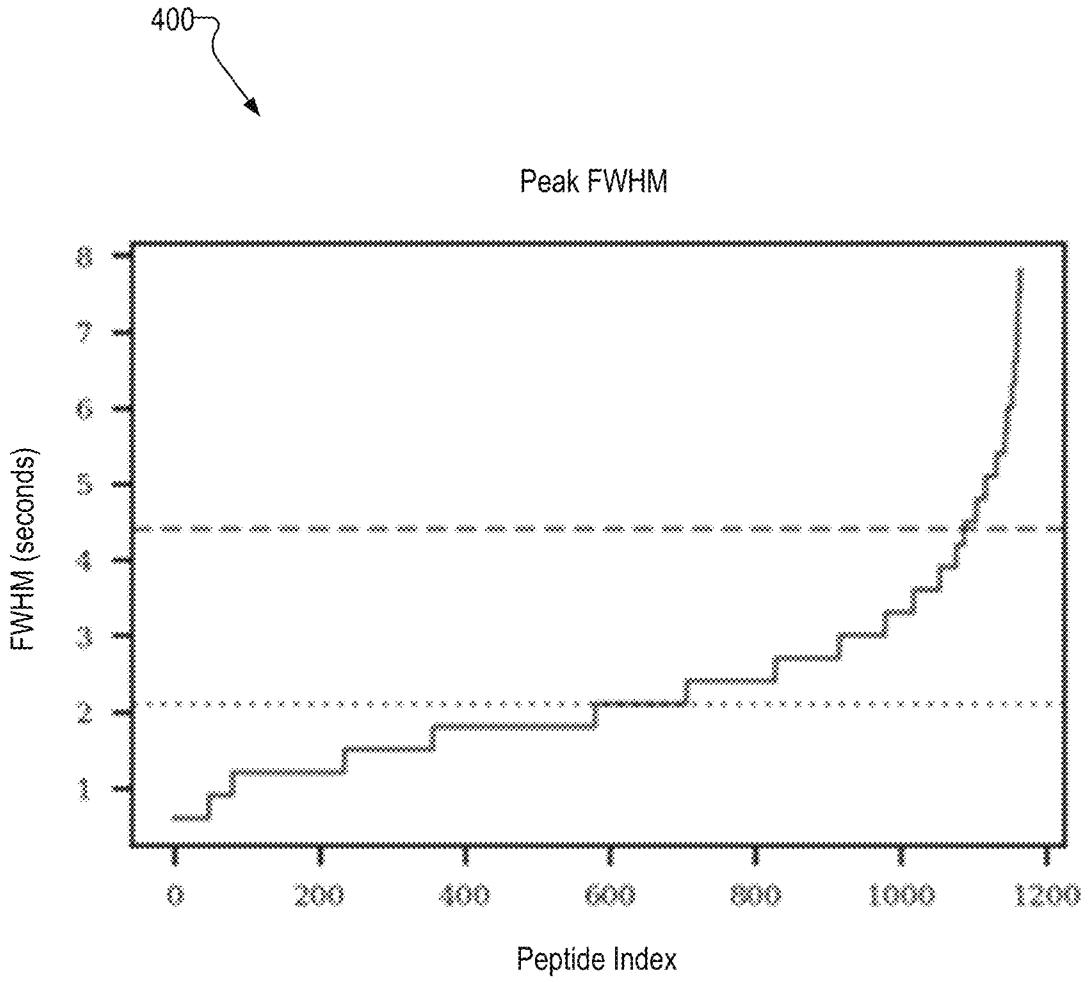
FIG. 4 shows a chart that depicts elution peak widths, sorted in order of increasing peak width, for a set of about 1,200 peptides in an illustrative capillary electrophoresis assay.

For example, FIG. 4 shows a chart 400 that depicts elution peak widths, sorted in order of increasing peak width, for a set of about 1,200 peptides in an illustrative capillary electrophoresis assay. The elution peak widths vary from about 0.5 seconds to about 4 seconds for most peptides, but some peptides have elution peak widths up to about 8 seconds. The median elution peak width is about 2.1 seconds and the mean elution peak width is about 4.5 seconds. Setting a constant acquisition cycle period for this assay will under-sample some peptides and over-sample others. Under-sampled peptides will not have sufficient data for accurate quantitation, and over-sampling other peptides consumes instrument resources that could otherwise be used to analyze other peptides.

The problems of under-sampling and over-sampling are addressed by using a dynamic sampling rate (e.g., a time-dependent or time-varying sampling rate) and/or a dynamic acquisition cycle period that are based on the time-varying elution peak width of the active targets over the course of an experiment. For example, a targeted mass analysis may be performed by generating an acquisition schedule that specifies a dynamic acquisition cycle period, wherein the acquisition cycle period varies over time. Compared to a constant sampling rate/constant acquisition cycle period, a variable sampling rate/acquisition cycle period ensures better quantitative accuracy of elution peak areas for peaks that would have been under-sampled, and higher throughput or limits of quantitation in regions of the experiment for peaks that would have been over-sampled. This can be especially useful when working with capillary electrophoresis, where peak widths can vary by factors of 4 or more over the course of a run. Systems and methods of performing targeted mass spectrometry with a dynamic sampling rate or dynamic acquisition cycle period will be described below in more detail.

Figure 5:
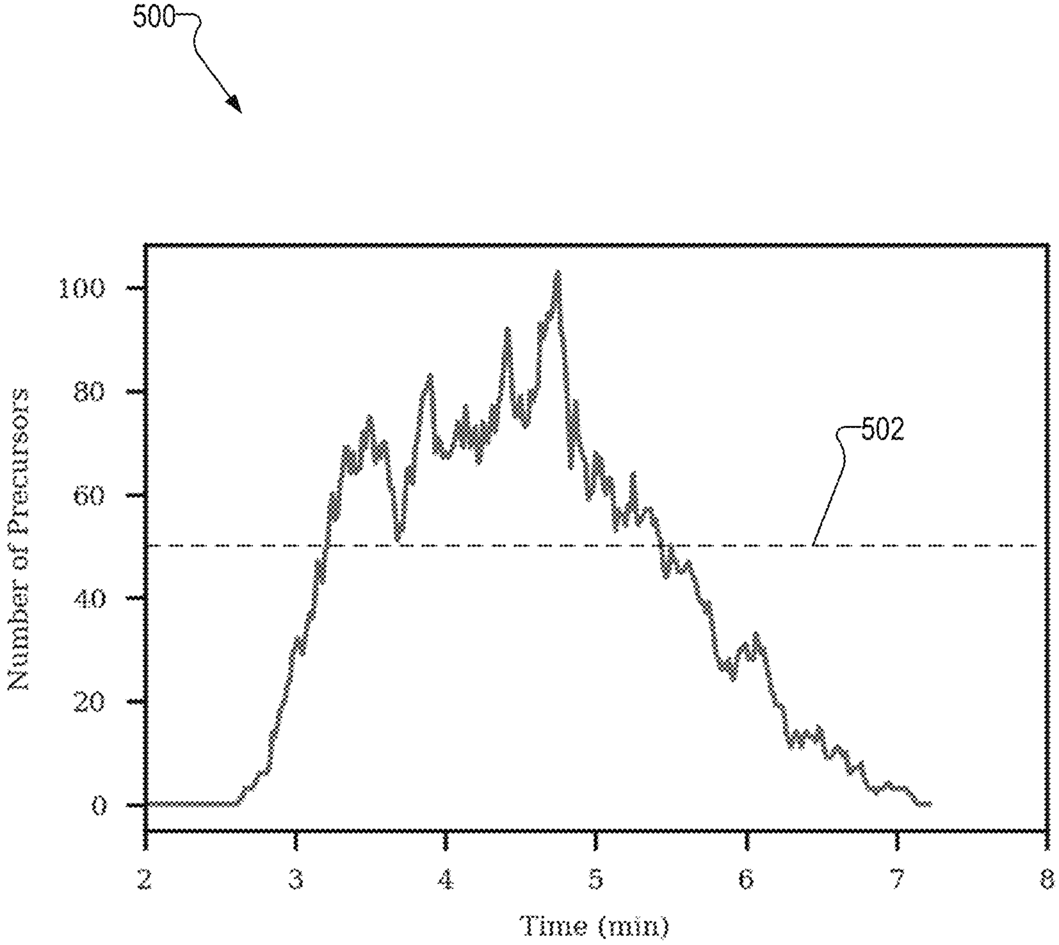
FIG. 5 shows a graph depicting the quantity of active targets (precursor ions) as a function of time during an illustrative targeted assay.

With targeted mass spectrometry, in particular for proteomics experiments, a sample also typically has more prospective analytes than the mass spectrometer can effectively measure. FIG. 5 shows a graph 500 depicting the quantity of active targets (precursor ions) as a function of time during an illustrative targeted assay. As shown in FIG. 5, the maximum number of active targets at any one time is about 100. If the instrument speed is 100 Hz and the acquisition cycle period based on an average elution peak width is 1 second, then this assay can be adequately analyzed by the instrument. However, if the acquisition cycle period is 0.5 seconds, then the instrument is too slow and there are too many analytes in the assay. Accordingly, target analytes must be removed from the assay at the appropriate time so that the acquisition cycle period does not exceed 0.5 seconds. Thus, the maximum number of targets that may be analyzed at any given time is 50, as shown by the dashed line 502. Removing target analytes from the assay is a cumbersome and inefficient process and may result in the removal of useful information.

The problems of optimizing the number of target analytes that are mass analyzed are addressed by acquisition scheduling with load balancing. Load balancing will be described below in more detail.

Figure 6:
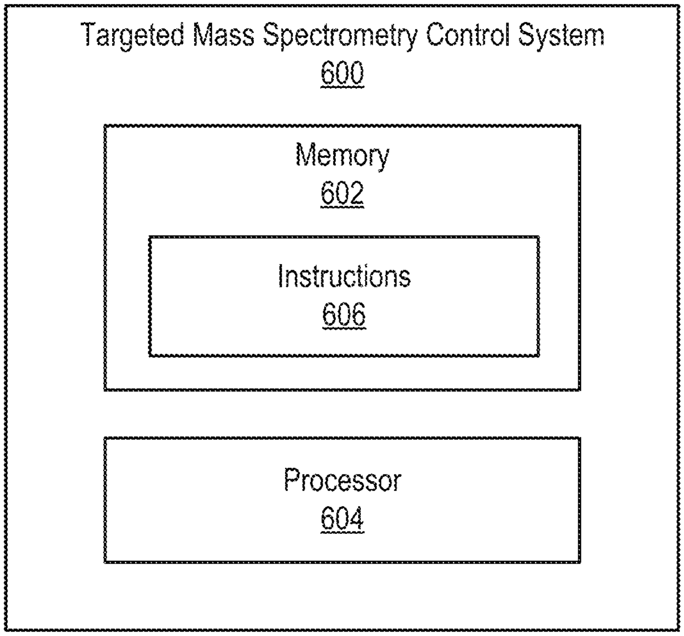
FIG. 6 shows a functional diagram of an illustrative targeted MS control system 600.

One or more operations associated with performing targeted mass spectrometry with improved acquisition scheduling and load balancing may be performed by a targeted MS control system in conjunction with an MS system (e.g., LC-MS system 100, a GC-MS system, or a CE-MS system). The targeted MS control system may control and/or perform one or more operations described herein. FIG. 6 shows a functional diagram of an illustrative targeted MS control system 600 ("system 600"). System 600 may be implemented entirely or in part by an MS system, such as LC-MS system 100 (e.g., by controller 106 and/or controller 206). Alternatively, system 600 may be implemented separately from the MS system (e.g., a remote computing system or server separate from but communicatively coupled to controller 106 and/or controller 206 of LC-MS system 100).

System 600 may include, without limitation, a memory 602 and a processor 604 selectively and communicatively coupled to one another. Memory 602 and processor 604 may each include or be implemented by hardware and/or software components (e.g., processors, memories, communication interfaces, instructions stored in memory for execution by the processors, etc.). Memory 602 and processor 604 may be distributed between multiple devices and/or multiple locations as may serve a particular implementation.

Memory 602 may maintain (e.g., store) executable data used by processor 604 to perform any of the operations described herein. For example, memory 602 may store instructions 606 that may be executed by processor 604 to perform any of the operations described herein. Instructions 606 may be implemented by any suitable application, software, code, and/or other executable data instance. Memory 602 may also maintain any data acquired, received, generated, managed, used, and/or transmitted by processor 604. For example, memory 602 may maintain LC-MS data, such as an acquisition schedule as described in detail below.

Processor 604 is configured to perform (e.g., execute instructions 606 stored in memory 602 to perform) various processing operations described herein. It will be recognized that the operations and examples described herein are merely illustrative of the many different types of operations that may be performed by processor 604. In the description herein, any references to operations performed by system 600 may be understood to be performed by processor 604 of system 600. Furthermore, in the description herein, any operations performed by system 600 may be understood to include system 600 directing, commanding, or instructing another system or device to perform the operations.

Figure 7:
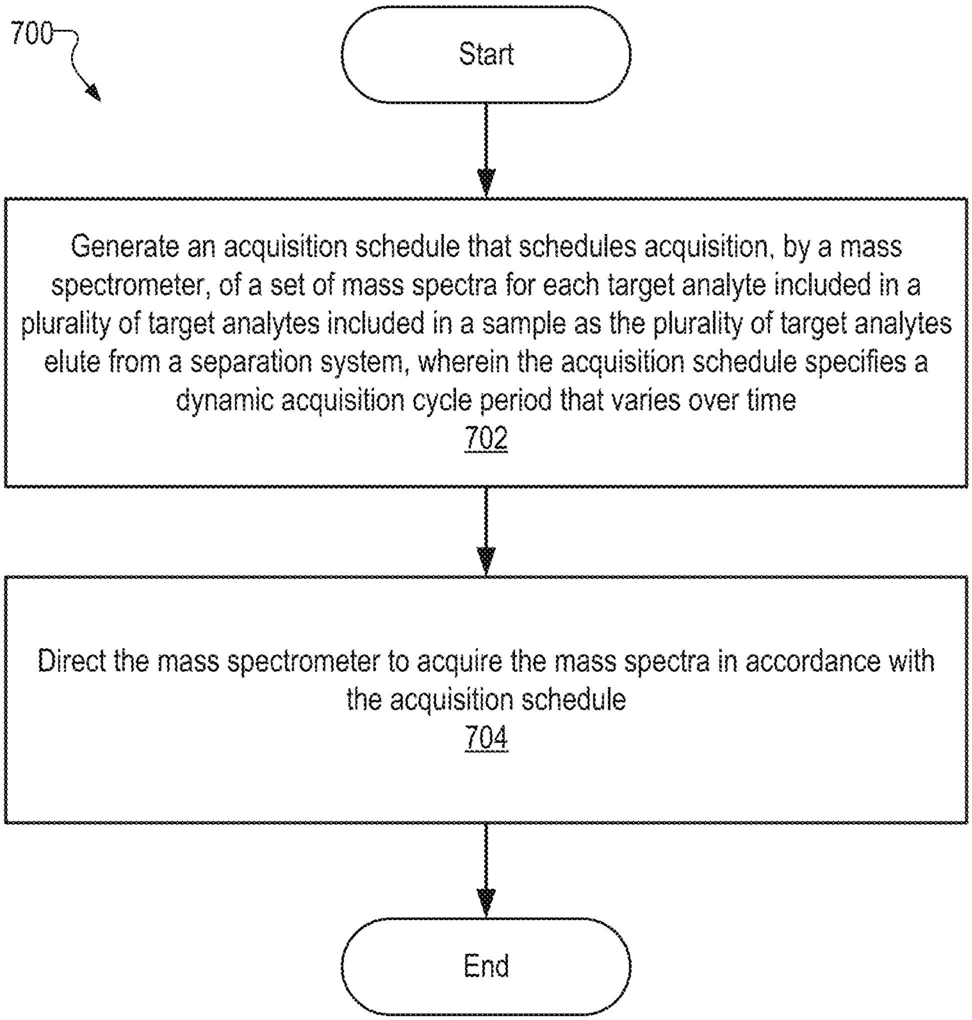
FIG. 7 shows an illustrative method of performing targeted mass spectrometry with a dynamic acquisition cycle period.

FIG. 7 shows an illustrative method 700 of performing targeted mass spectrometry with a dynamic acquisition cycle period. While FIG. 7 shows illustrative operations according to one embodiment, other embodiments may omit, add to, reorder, and/or modify any of the operations shown in FIG. 7. One or more of the operations shown in FIG. 7 may be performed by LC-MS system 100 and/or system 600, any components included therein, and/or any implementations thereof (e.g., mass spectrometer 104, one or more components of mass spectrometer 104, and/or a remote computing system separate from but communicatively coupled to mass spectrometer 104).

At operation 702, system 600 generates an acquisition schedule for a targeted assay. The acquisition schedule schedules acquisition, by a mass spectrometer, of a set of mass spectra for each target analyte included in a plurality of target analytes included in a sample as the plurality of target analytes elute from a separation system. The acquisition schedule specifies a dynamic acquisition cycle period. A dynamic acquisition cycle is an acquisition cycle period that varies over time. Operation 702 will be described below in more detail.

At operation 704, system 600 directs the mass spectrometer to acquire the mass spectra in accordance with the acquisition schedule.

Operation 702 will now be described in more detail. To generate the acquisition schedule with a dynamic acquisition cycle period, system 600 determines the sampling rate requirement for the experiment and time-varying peak widths for the target analytes included in the sample. System 600 sets the time-varying acquisition cycle period based on the time-varying peak width and the sampling rate requirement.

The sampling rate requirement may be specified by method parameters for the particular experiment. For instance, the method parameters may specify a sampling rate requirement of 6 acquisitions across each peak. System 600 may access the method parameters from local storage (e.g., memory 602), from a remote a computing system, or from user input provided by a user.

System 600 determines the time-varying peak widths of the target analytes based on elution peak width data representative of the expected elution times for target analytes included in a list of known target analytes included in the sample. In some examples, the elution peak width data is accessed from published data, which may be accessed, for example, from local storage (e.g., memory 602) or from a remote computing system.

In other examples, the elution peak width data is generated by performing a characterization analysis of the sample prior to operation 702. In some examples, the characterization analysis is a data-dependent acquisition (DDA) analysis of the sample. In alternative examples, the characterization analysis includes a set of multiple, narrow isolation window data-independent acquisition (DIA) experiments that together span the m/z range of interest.

Figure 8:
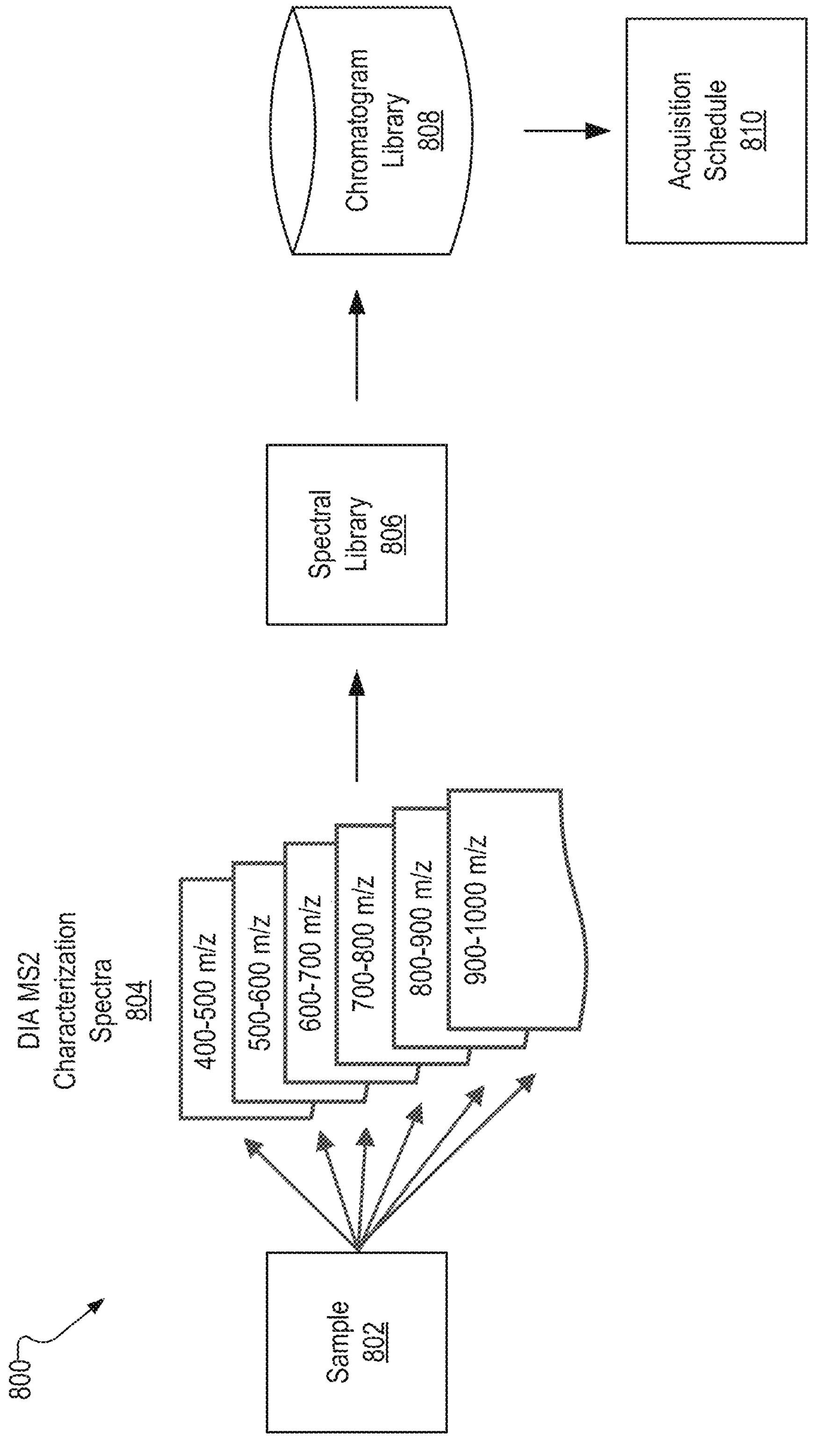
FIG. 8 shows a functional diagram of an illustrative scheme for characterizing a sample using a gas-phase fractionation DIA analysis.

FIG. 8 shows a functional diagram of an illustrative scheme 800 for characterizing the sample using a gas-phase fractionation DIA analysis. As shown, multiple injections of a sample 802 (e.g., sample 108) are analyzed by a combined separation-mass spectrometry system (e.g., LC-MS system 100). System 600 directs a mass spectrometer to acquire DIA MS2 characterization spectra 804 for each injection by analyzing the product ions using a narrow isolation window successively positioned throughout a narrow subset of a characterization m/z range of interest as the analytes elute from the separation system. As shown in FIG. 8, sample 802 is injected six different times, with each injection spanning 100 m/z of the characterization m/z range of interest spanning from 400 m/z to 1000 m/z. In some examples, the isolation width of the isolation window is greater than 0 m/z but less than or equal to about 4 m/z. In other examples, the isolation width of the isolation window is greater than 0 m/z but less than or equal to about 2 m/z. In yet further examples, the isolation width is greater than 0 m/z but less than or equal to about 1 m/z. By using a narrow subset of the characterization m/z range of interest and a narrow isolation width, the sample can be analyzed with high sensitivity and precision. The characterization m/z range of interest, the subset of the characterization m/z range of interest, and the number of injections need not be as shown in FIG. 8 but may be modified as may suit a particular implementation.

System 600 compares the MS2 characterization spectra 804 against a spectral library 806 to identify spectral matches and build a chromatogram library 808. Chromatogram library 808 records elution time, precursor m/z, peptide fragmentation patterns, and known interferences that identify each analyte within sample 802. In some examples, the analytes detected in MS2 characterization spectra 804 may be filtered, based on the number of transitions, time correlation, experimental relevance (e.g., target analytes of interest), and/or total area, for characteristics that enable high quality analysis. For instance, quantifiable peptides may include peptides that have at least 4 transitions with a time correlation greater than or equal to 0.9 and a total area greater than 1000. However, other parameters and/or parameter values may be selected to determine the population of peptides that are quantifiable. Elution peak width data may be generated or extracted from chromatogram library 808.

Alternatively to characterizing the sample experimentally as in scheme 800, the characterization analysis may be performed in silico, such as by using a deep learning model (e.g., Prosit, developed by The ProteomeTools Project) that generates predicted MS2 characterization spectra and elution times for target analytes included in the sample. The predicted MS2 characterization spectra may be compared against a spectral library (e.g., spectral library 806) to identify spectral matches and build a chromatogram library (e.g., chromatogram library 808), which, as described above, may be used to generate or extract the elution peak width data.

Figure 9:
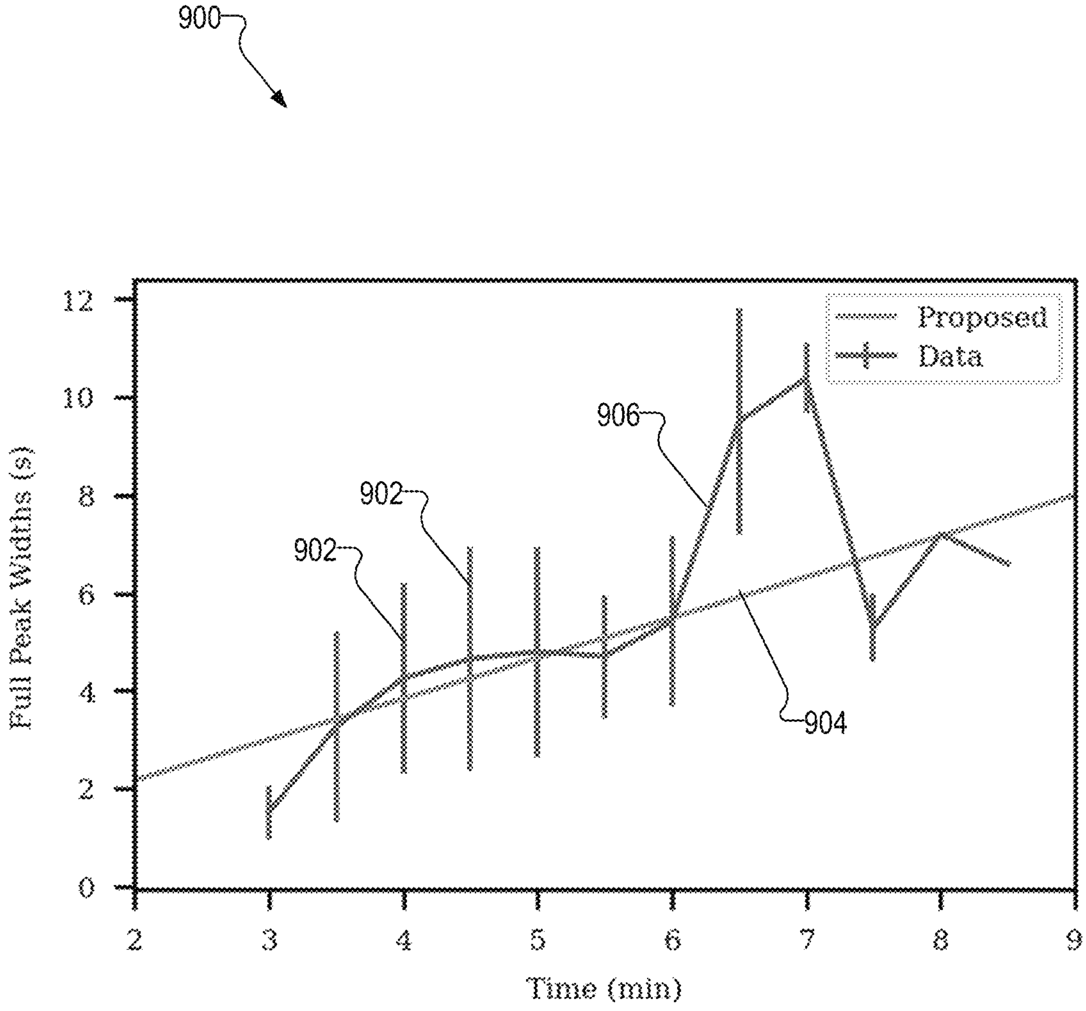
FIG. 9 shows a graph that depicts elution peak width data plotted as a function of time.

FIG. 9 shows a graph 900 that depicts elution peak width data plotted as a function of time. Time is measured from an initialization event, such as injection of the sample into an LC column, into a CE capillary, or into an ion mobility separator. Graph 900 depicts elution peak width data as a range 902 of elution peak widths for each set of co-eluting target analytes (e.g., each distinct set of active targets) at various points in time during the analysis. For example, the elution peak widths for the active targets at 3 minutes of elapsed time range from about 1 second to about 2 seconds. The elution peak widths of the active targets at about 4 minutes of elapsed time range from about 2.5 seconds to about 6 seconds. The elution peak widths of the active targets at about 6 minutes of elapsed time range from about 3 seconds to about 7 seconds. The elution peak widths of the active targets at about 7 minutes of elapsed time range from about 9.5 seconds to about 11 seconds.

The acquisition schedule may be generated based on the time-varying elution peak width data in various different ways. In some examples, the acquisition schedule is generated based on an elution peak width function that represents a time-varying elution peak width as a function of time. In these examples, system 600 accesses elution peak width data for a list of target analytes included in the sample and fits a curve to the time-varying elution peak width data.

For example, graph 900 includes a curve 904 that is fitted to the elution peak width data. Curve 904 represents the elution peak width function over time. In the example of FIG. 9, curve 904 is a linear curve fitted to the statistical median of the elution peak width data for each set of co-eluting target analytes. However, curve 904 may be fitted to the elution peak width data in any other suitable way. For example, curve 904 may be fitted to the statistical mean, maximum, minimum, weighted mean, or any other statistical representation of elution peak width data for each set of co-eluting target analytes. Additionally or alternatively, curve 904 may have a non-linear form, such as a second-, third-, or higher-order polynomial. In yet further examples, curve 904 is a piecewise or stepwise function. For example, a first linear (or non-linear) function may be fitted to elution peak width data from 3 to 6 minutes, a second linear (or non-linear) function may be fitted to elution peak width data from 6 to 7 minutes, and a third linear (or non-linear) function may be fitted to elution peak width data from about 7 to about 8.5 minutes.

System 600 determines the dynamic acquisition cycle based on the elution peak width function and the sampling rate. For example, using curve 904 and based on a constant sampling rate requirement of 8 samples across each peak, the acquisition cycle period is about 187 milliseconds (ms) at 3 minutes of elapsed time, 475 ms at 4 minutes of elapsed time, about 687 ms at 6 minutes of elapsed time, and about 1312 ms at 7 minutes of elapsed time. Thus, system 600 may generate an acquisition schedule that specifies a dynamic acquisition cycle period as a function of time. The acquisition cycle period at any given point in time during the experiment is specified by the acquisition schedule.

In the examples described above, the dynamic acquisition cycle period is determined by fitting a function to the elution peak width data and determining the dynamic acquisition cycle period based on the fitted function and the sampling rate requirement. In other examples, the dynamic acquisition cycle period is determined by converting, based on the sampling rate requirement, the elution peak width data to acquisition cycle period data representing an acquisition cycle period for each active target and fitting an acquisition cycle period curve to the acquisition cycle period data. The acquisition cycle period curve represents the dynamic acquisition cycle period as a function of time.

In other examples of generating the acquisition schedule, system 600 determines a group elution peak width for each set of a plurality of sets of co-eluting targets and sets the acquisition cycle period for each set of co-eluting targets based on its group elution peak width and the sampling rate requirement. These examples are particularly useful in scenarios where the trend of elution peak width versus time cannot be expressed as a straight-forward function.

For example, as shown in FIG. 9, system 600 determines a group elution peak width for each set of co-eluting target analytes, represented by ranges 902. The group elution peak width of each set of co-eluting target analytes may be the mean, median, maximum, minimum, weighted mean, or other statistical representation of the elution peak widths of the set of target analytes. In graph 900, a curve 906 represents the time-varying group elution peak widths determined as the median of each set of co-eluting target analytes. System 600 determines a time-varying acquisition cycle period based on the group elution peak width of each set of co-eluting target analytes and a sampling rate requirement for the experiment.

In yet further examples of generating the acquisition schedule, system 600 sets an individual acquisition cycle period for each target analyte included in the set of active target analytes based on the individual elution peak width of each target analyte. System 600 determines the individual elution peak width of each individual target analyte and determines, based on the individual elution peak width and a sampling rate requirement, an individual acquisition cycle period for each individual target analyte. Thus, mass spectra data may be acquired at the appropriate sampling rate for each target and thus prevent under-sampling and over-sampling of each target.

In some scenarios, some co-eluting target analytes may have different elution peak widths and/or acquisition cycle periods. Accordingly, system 600 may use a scheduling algorithm to determine which co-eluting analytes can be included in the acquisition schedule (e.g., included in the target acquisition list) and which co-eluting analytes cannot be included in the acquisition schedule. In some examples, the scheduling algorithm ranks potential targets according to a priority value and, considering each potential target in order of priority value, adds potential targets to the acquisition schedule if the potential target fits within the acquisition schedule. If the potential target does not fit within the acquisition schedule, the potential target is not added to the acquisition schedule.

Figure 10:
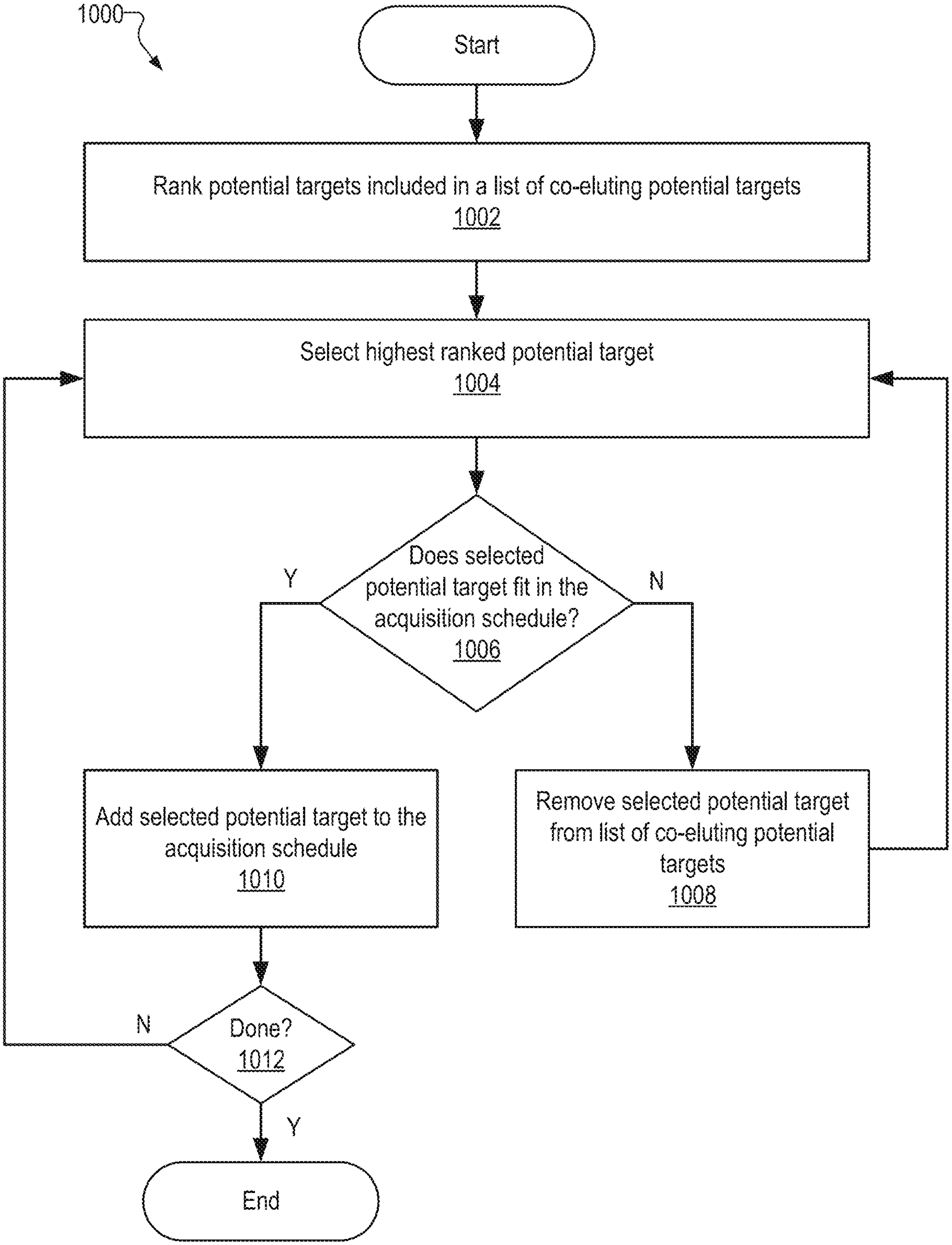
FIG. 10 shows an illustrative method for acquisition scheduling for individual targets.

FIG. 10 shows an illustrative method 1000 for performing individual target scheduling. While FIG. 10 shows illustrative operations according to one embodiment, other embodiments may omit, add to, reorder, and/or modify any of the operations shown in FIG. 10. One or more of the operations shown in FIG. 10 may be performed by LC-MS system 100 and/or system 600, any components included therein, and/or any implementations thereof (e.g., mass spectrometer 104, one or more components of mass spectrometer 104, and/or a remote computing system separate from but communicatively coupled to mass spectrometer 104).

At operation 1002, system 600 ranks potential targets included in a list of co-eluting potential targets. The list of co-eluting potential targets may be obtained, for example, from chromatogram library 808 or elution peak width data. The potential targets may be ranked based on any suitable parameter. In some examples, the potential targets are ranked in order of decreasing (or increasing) acquisition cycle period so that the potential target with the longest (or shortest) acquisition cycle period is assigned the highest priority. The acquisition cycle period may be determined as explained above for each individual potential target.

In some examples, the ranking may be further modified to prioritize one or more potential targets over others for consideration ahead of turn. For example, a particular analyte of interest may be ranked higher than it would otherwise be (e.g., based on acquisition cycle period) to ensure that the analyte of interest is included in the acquisition schedule. The ranking may be modified manually by a user or automatically based on known experiment parameters or conditions. In some examples, the ranking of potential targets is adjusted so that a minimum or maximum number of peptide targets per protein are added to the acquisition schedule.

At operation 1004, system 600 selects the highest ranked (highest priority) potential target for consideration whether to add the selected potential target to the acquisition schedule.

At operation 1006, system 600 determines whether the selected potential target fits within the acquisition schedule. The selected potential target fits within the acquisition schedule if a sufficient number of acquisitions for the target (e.g., sufficient to satisfy the sampling rate requirement) fit in the acquisition schedule without overlapping with any scheduled acquisitions for targets already included in the acquisition schedule. If a sufficient number of acquisitions cannot be included without overlapping with scheduled acquisitions already included in the acquisition schedule, system 600 determines that the selected potential target does not fit in the acquisition schedule.

In some examples, system 600 determines that a potential target that has one or more acquisitions that would overlap with one or more scheduled acquisitions fits in the acquisition schedule if an adjustment can be made to one or more acquisitions for the target (or to one or more scheduled acquisitions already in the acquisition schedule) so that the selected target's acquisitions do not overlap with any scheduled acquisitions. In some examples, only adjustments less than a threshold amount may be made (e.g., (e.g., a time shift of less than 10 ms, 20 ms, 100 ms, a percentage of the elution peak width, or acquisition cycle period, etc.).

If system 600 determines that the potential target does not fit in the acquisition schedule, processing proceeds to operation 1008. At operation 1008, the selected potential target is not added to the acquisition schedule and is removed from the list of potential co-eluting targets (or is otherwise marked as reviewed or as not a fit). Processing then returns to operation 1004 to consider the next highest ranked potential target.

On the other hand, if system 600 determines that the selected potential target fits in the acquisition schedule, processing proceeds to operation 1010. At operation 1010, the selected potential target is added to the acquisition schedule with the acquisition cycle period of the potential target. Accordingly, a sufficient number of acquisitions are scheduled to be performed for the selected potential target to satisfy the sampling rate requirement. In some examples, if an adjustment is necessary for the selected potential target to fit, the potential target is added to the acquisition schedule by adjusting one or more acquisitions of the potential target or by adjusting one more scheduled acquisitions so that the acquisitions for the potential target do not overlap with any scheduled acquisitions.

At operation 1012, system 600 determines whether all potential co-eluting targets have been considered. If all potential co-eluting targets have not been considered, processing returns to operation 1004 to consider the next potential target in the set of co-eluting potential targets. If all potential co-eluting targets have been considered, or if the acquisition schedule is full (e.g., there are an insufficient number of unscheduled time periods that are at least as long as the instrument speed), method 1000 terminates for the set of co-eluting target analytes. Method 1000 may be performed for each set of co-eluting target analytes throughout the experiment run.

Figure 11:
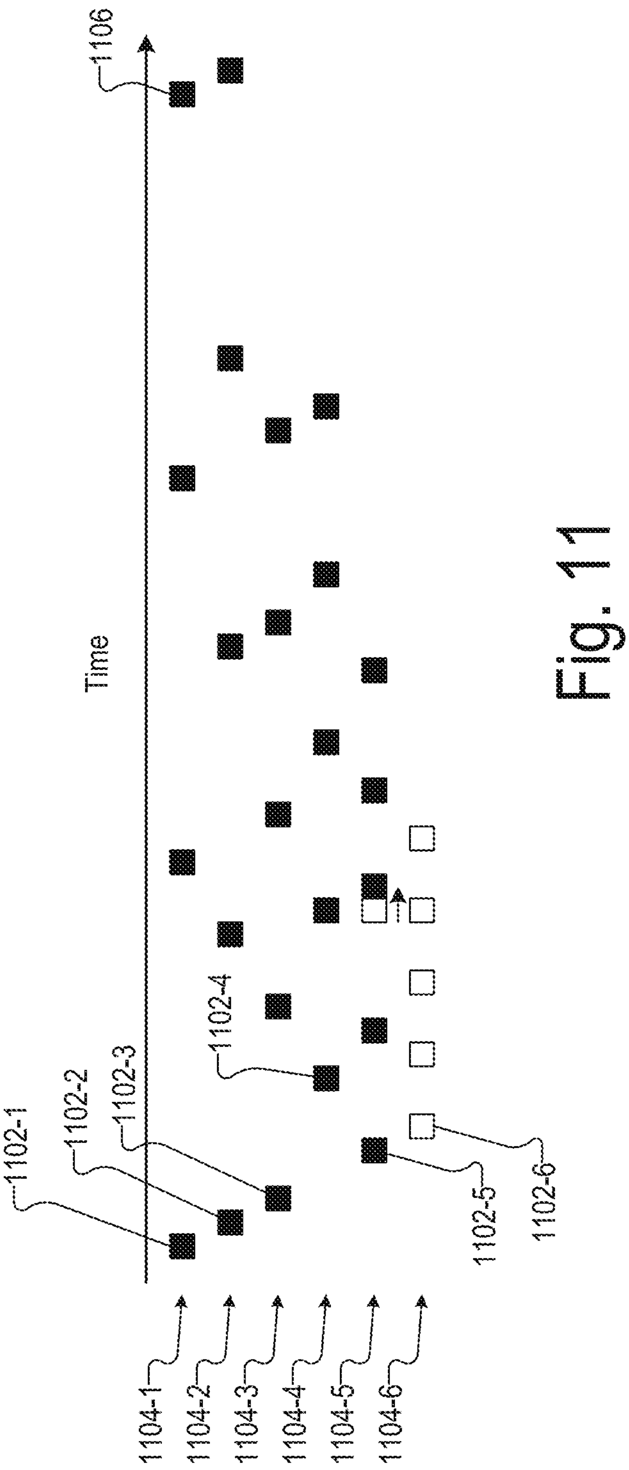
FIG. 11 shows an illustrative implementation of the method of FIG. 10 for generating a dynamic acquisition schedule with individual acquisition cycle periods for individual target analytes.

FIG. 11 shows an illustrative implementation of method 1000 for generating a dynamic acquisition schedule with individual acquisition cycle periods for individual target analytes. As shown, a set of acquisitions 1102-1 (represented by solid boxes) for a first target 1104-1 having the longest acquisition cycle period are added to the acquisition schedule. Each of the second target 1104-2, third target 1104-3, and fourth target 1104-4 are considered in turn in order of decreasing acquisition cycle period and are determined to not overlap with any prior scheduled acquisitions. Accordingly, acquisitions 1102-2, 1102-3, and 1102-4 (represented by solid boxes) for each of the second target 1104-2, third target 1104-3, and fourth target 1104-4, respectively, are added in turn to the acquisition schedule. A set of acquisitions 1102-5 (represented by solid boxes) for a fifth target 1104-5 includes an acquisition 1102-5 (shown as the open box) that would overlap with a scheduled acquisition 1102-4 for fourth target 1104-4. However, the overlapping acquisition 1102-5 can be adjusted by a slight time shift so that the acquisition 1102-5 does not overlap with acquisition 1102-4 or any other scheduled acquisition. Accordingly, the set of acquisitions for fifth target 1104-5 are added to the acquisition schedule. A set of acquisitions 1102-6 (represented by open boxes) for a sixth target 1104-6 includes an acquisition 1102-6 that would overlap with a scheduled acquisition 1102-4 for fourth target 1104-4. However, the overlapping acquisition 1102-6 cannot be adjusted within a threshold amount to not overlap with the acquisition 1102-4. Accordingly, the set of acquisitions for sixth target 1104-6 are not added to the acquisition schedule (and thus are shown in open boxes).

Various modifications may be made to the dynamic acquisition scheduling examples described above. In some examples, the sampling rate requirement is not constant but also varies with time. For example, the sampling rate requirement may be set well above the Nyquist limit when greater sensitivity is desired for certain target analytes and/or when there are relatively few active targets, and may be set at or near the Nyquist limit when there are many active targets so that a longer acquisition cycle period is beneficial. Accordingly, the dynamic acquisition cycle period is determined based on both the time-varying elution peak width and the time-varying sampling rate requirement.

In some examples, system 600 generates the acquisition schedule based on user input. For instance, system 600 may present the elution peak width function to a user and request user confirmation of the elution peak width function before generating the acquisition schedule based on the elution peak width function. Additionally or alternatively, system 600 generates the elution peak width function based on user input specifying how the function is fitted to the elution peak width data (e.g., based on a mean, median, maximum, minimum, or weighted mean of the elution peak width data) and/or a form of the elution peak width function (e.g., linear, polynomial, piecewise, etc.).

Figure 12:
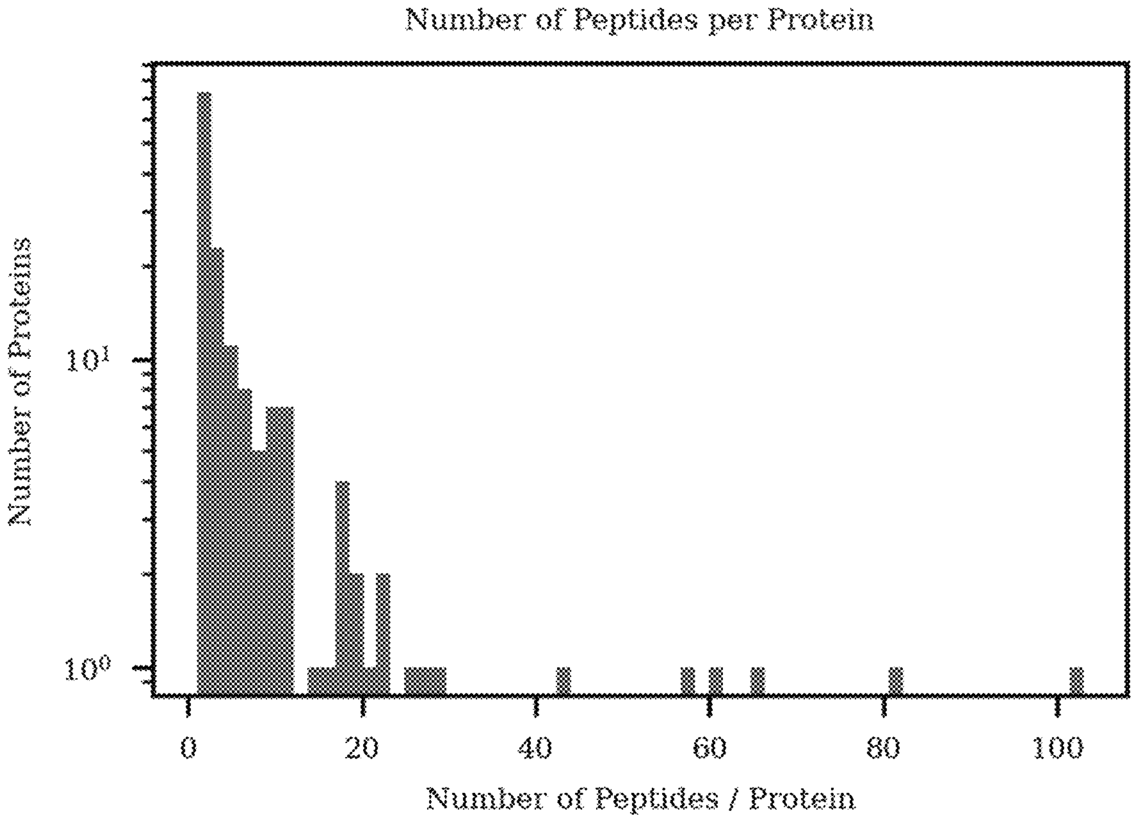
FIG. 12 shows a chart that shows the number of proteins for various values of peptides per protein in blood plasma.

Load balancing for targeted assay generation will now be described. Load balancing is performed to generate, prior to performing a targeted mass spectrometry experiment, an acquisition list of target analytes (e.g., peptides or other molecules) for a targeted assay. Load balancing is performed to accept target analytes to the acquisition list according to certain criteria to balance the number of analyte groups (e.g., proteins or molecule groups) that are analyzed so as to prevent oversampling and under-sampling of certain analyte groups. If the analyte group variable were ignored, certain analyte groups would likely be over-represented. For example, in some samples like blood plasma, there are a few proteins with many more peptides than the other proteins in the sample, as shown in FIG. 12. FIG. 12 shows a chart 1200 that shows the number of proteins for various values of peptides per protein in blood plasma. FIG. 12 shows that, while most proteins have fewer than 20 peptides, many proteins have 20 or more peptides and some proteins have more than 40 peptides. As a result, the proteins with a large number of peptides would likely be over-sampled using traditional assay generation methods. Load balancing is performed to select, for a targeted assay, peptides from an optimum number of proteins included in the sample to balance the number of target peptides per protein to prevent over-sampling of certain proteins.

Figure 13:
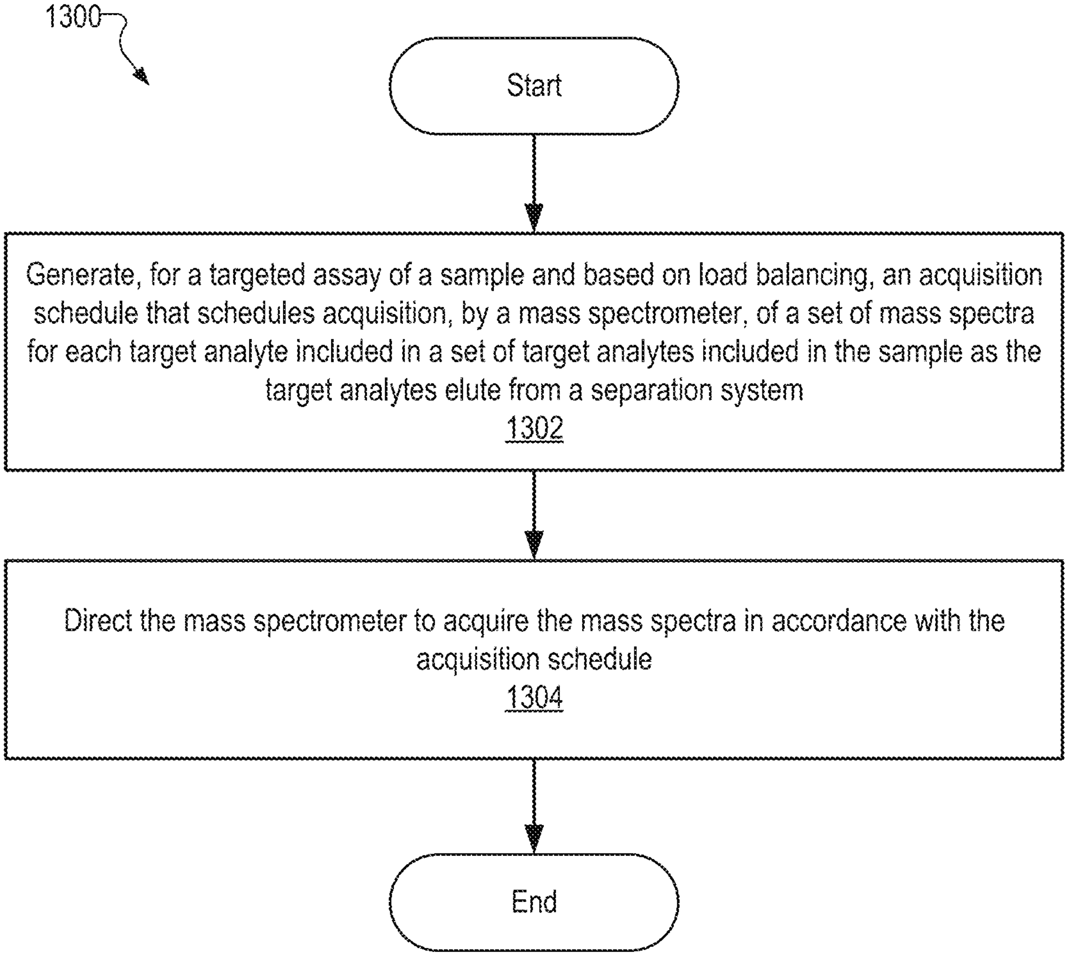
FIG. 13 shows an illustrative method of performing targeted mass spectrometry with load balancing.

FIG. 13 shows an illustrative method 1300 of performing targeted mass spectrometry with load balancing. While FIG. 13 shows illustrative operations according to one embodiment, other embodiments may omit, add to, reorder, and/or modify any of the operations shown in FIG. 13. One or more of the operations shown in FIG. 13 may be performed by LC-MS system 100 and/or system 600, any components included therein, and/or any implementations thereof (e.g., mass spectrometer 104, one or more components of mass spectrometer 104, and/or a remote computing system separate from but communicatively coupled to mass spectrometer 104).

At operation 1302, system 600 generates, for a targeted assay of a sample, an acquisition schedule that schedules acquisition, by a mass spectrometer, of a set of mass spectra for each target analyte included in a set of target analytes included in the sample as the target analytes elute from a separation system (e.g., from an LC-MS system, a GC-MS system, a CE-MS system, an IM-MS system, etc.). Generating the acquisition schedule includes performing load balancing, as will be described below in more detail.

At operation 1304, system 600 directs the mass spectrometer to acquire the mass spectra in accordance with the acquisition schedule.

Operation 1302 and various illustrative examples of performing load balancing will now be described. In some examples, system 600 generates the acquisition schedule by accessing a list of estimated (e.g., expected or known) analytes (e.g., peptides or molecules) present in the sample to be analyzed. The list may be obtained, for example, from known or published sources or from a characterization analysis of the sample (e.g., from chromatogram library 808), as described above. System 600 identifies the analyte group (e.g., protein or molecule group) corresponding to each analyte in the list. An analyte group refers to a group of analytes having common or related chemical, physical, and/or functional properties. For example, in proteomics analyses each analyte group is a distinct protein and the analytes corresponding to the analyte group are peptides included in or derived from the protein. In other analyses, such as small molecule analyses, each analyte group (e.g., molecule group) may be, for example, a distinct compound class, a group of molecules having common or related chemical moieties or functional groups, a group of molecules that participate in certain biological functions or pathways, and/or groups of molecules of a certain size, molecular weight, acidity, boiling point, toxicity, etc. System 600 may identify the analyte group corresponding to each analyte in any suitable way, such as by referring to known or published information. System 600 selects, from the list of analytes, the set of target analytes to be included in the acquisition schedule for the targeted assay based on selection criteria and the analyte group corresponding to each respective analyte included in the list of analytes.

In some examples, the selection criteria specify a maximum number of analytes per analyte group that may be added to the acquisition schedule to ensure that instrument resources are not consumed by only a few analyte groups having many different analytes. In some examples, the maximum number is 3, 4, 5, 6, 7, 8, 9, 10, 12, 15, 20, or any other suitable number. The maximum number may be set by default, by method parameters for the targeted assay, based on the quantity of analyte groups in the sample, or by user input.

The set of target analytes may be selected based on a maximum number of analytes per analyte group threshold in any suitable way. In some examples, each analyte group is considered in turn, adding analytes corresponding to the analyte group until the maximum number of analytes have been added to the acquisition schedule for that analyte group. In other examples, only one analyte from an analyte group is considered before considering the next analyte group. For each analyte, system 600 checks whether the maximum number of analytes for the analyte group corresponding to the analyte have already been added to the acquisition schedule. If the maximum threshold has been reached, the analyte is not added to the acquisition schedule and an analyte from the next analyte group is then considered. If the maximum threshold has not been reached, the analyte is added to the acquisition schedule and then an analyte from the next analyte group is considered. This process continues until the acquisition schedule is full or until the maximum threshold has been reached for each analyte group.

Figure 14:
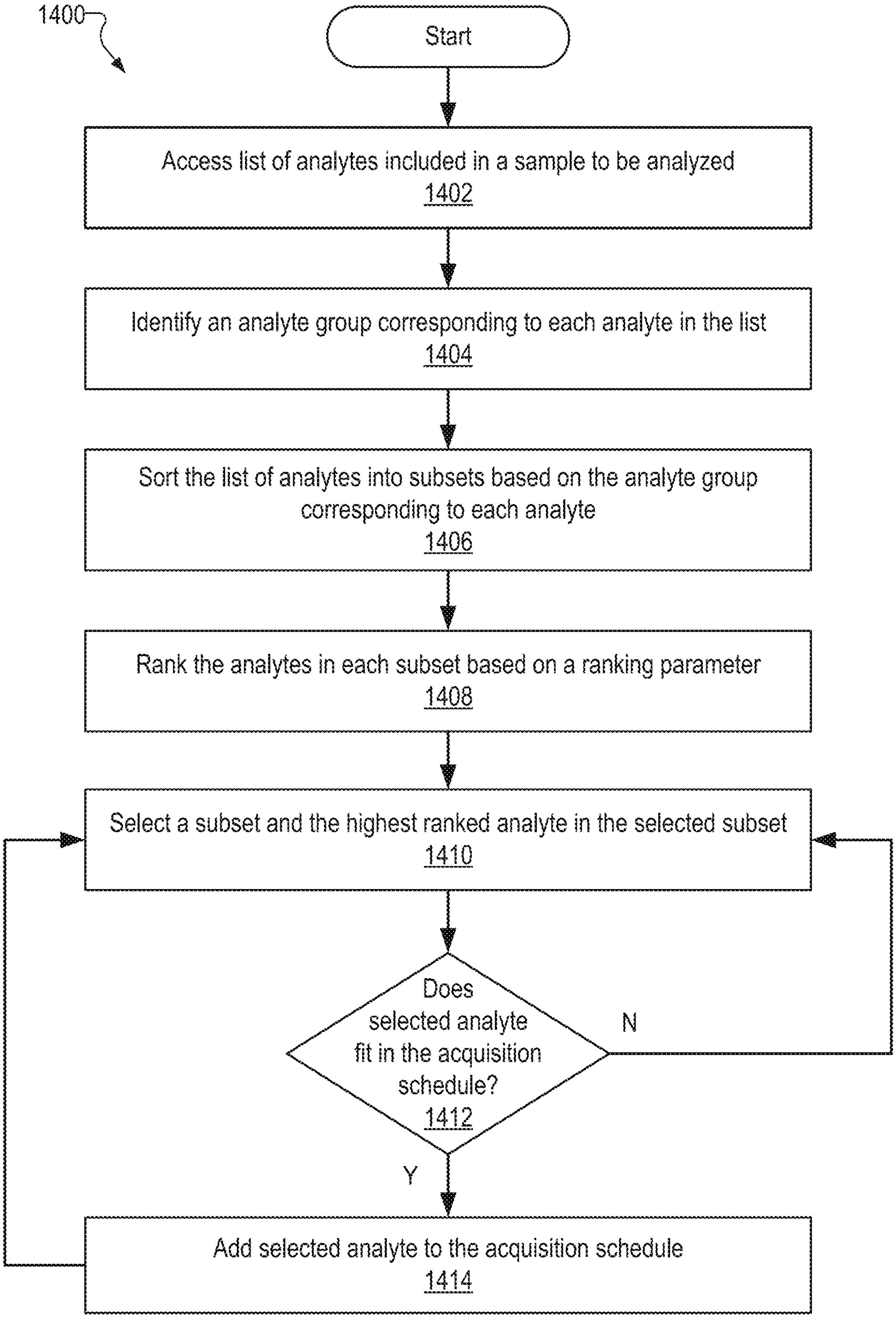
FIG. 14 shows an illustrative method of load balancing to prioritize targeting analytes from as many analyte groups as possible.

In other examples, the selection criteria prioritize targeting analytes from as many analyte groups as possible. In these examples, the selection criteria specify a particular order for selecting target analytes to include in the acquisition schedule. FIG. 14 shows an illustrative method 1400 of load balancing based on adding analytes from as many analyte groups as possible. While FIG. 14 shows illustrative operations according to one embodiment, other embodiments may omit, add to, reorder, and/or modify any of the operations shown in FIG. 14.

At operation 1402, system 600 accesses a list of analytes estimated (e.g., expected or known) to be present in the sample to be analyzed. The list may be obtained, for example, from known or published sources or from a characterization analysis of the sample (e.g., from chromatogram library 808), as described above.

At operation 1404, system 600 identifies the analyte group corresponding to each analyte in the list. System 600 may identify the corresponding analyte groups in any suitable way, such as based on known or published information.

At operation 1406, the list of potential target analytes is sorted into a plurality of subsets based on the analyte group from which each analyte was derived (e.g., by the first aspect of the protein to which each peptide belongs). Each subset of analytes corresponds to a distinct analyte group, and, as noted above, each analyte group corresponds to multiple distinct analytes.

At operation 1408, system 600 ranks the analytes in each subset by a ranking parameter. The ranking parameter may include, for example, the measured abundance of the analyte in one or more previous experiments (e.g., in a characterization analysis and/or targeted assays), the cross-correlation (XCorr) value of the analyte (e.g., the cross-correlation of the analyte spectra against library spectra), or the coefficient of variation of peak area for the analyte over several replicate experiments. Other suitable ranking parameter may be used.

At operation 1410, system 600 selects a subset for consideration and selects the highest ranked remaining analyte in the selected subset. If the selected subset has no remaining analytes for consideration, the next subset is considered.

At operation 1412, system 600 determines whether the selected analyte fits in the acquisition schedule. If the selected analytes fits in the acquisition schedule, the selected analyte is added to the acquisition schedule at operation 1414. Processing then returns to operation 1410 to select the next subset. The next subset is different from the immediately prior subset.

If the selected analyte does not fit in the acquisition schedule at operation 1412, the selected analyte is not added to the acquisition schedule and processing then returns to operation 1410 to select the next subset. The next subset is different from the immediately prior subset. Method 1400 continues until no additional analytes would fit in the acquisition schedule. The acquisition schedule may then be used for the targeted assay (e.g., in operation 1304 of method 1300).

In some examples, the selected analyte fits in the acquisition schedule if the acquisition cycle period required to analyze all active targets around the elution time of the selected analyte is more than is possible based on the instrument speed. For example, the selected analyte fits in the acquisition schedule if a sufficient number of acquisitions for the selected analyte (e.g., sufficient to satisfy the sampling rate requirement) fit in the acquisition schedule without overlapping with any scheduled acquisitions for analytes already included in the acquisition schedule. If a sufficient number of acquisitions cannot be included without overlapping with scheduled acquisitions already included in the acquisition schedule, system 600 determines that the selected analyte does not fit in the acquisition schedule.

In some examples, a selected analyte that has one or more acquisitions that would overlap with one or more scheduled acquisitions fits in the acquisition schedule if an adjustment can be made to one or more acquisitions for the selected analyte (or to one or more scheduled acquisitions already in the acquisition schedule) so that the selected analyte's acquisitions do not overlap with any scheduled acquisitions. In some examples, only adjustments less than a threshold amount may be made (e.g., (e.g., a time shift of less than 10 ms, 20 ms, 100 ms, a percentage of the elution peak width, or acquisition cycle period, etc.).

Various modifications may be implemented in method 1400. In the preceding example, equal priority was given to each analyte group subset in turn, ensuring an equal possibility for inclusion. In other examples, the selection criteria further specify a maximum number of analytes per analyte group subset, as explained above, to maintain as small of a list of targets as possible and avoid the inclusion of additional analytes which, on the analyte group level, could be providing redundant information. In some examples, the maximum number of analytes per analyte group is not the same for all analyte groups but varies based on the analyte group. The maximum number of analytes criterion may be implemented as previously described above.

In some examples, the ranking of analytes within a subset may be modified to prioritize one or more potential targets over others for consideration ahead of turn. For example, a particular analyte of interest may be ranked higher than it would otherwise be (e.g., based on its ranking parameter) to ensure that the analyte is included in the acquisition schedule. The ranking may be modified manually by a user or automatically based on known experiment parameters or conditions.

In yet further examples, the analyte group subsets may also be ranked (placed in order for sequential consideration at operation 1410) based on characteristics of the analyte group and/or analytes within the analyte group. For example, analyte group subsets may be ranked based on a cumulative score (e.g., total, average, median, maximum, minimum, etc.) of the ranking parameter of all or a subset of analytes corresponding to each analyte group.

In further examples, load balancing takes into account the time-varying elution peak width and/or time-varying acquisition cycle period. As explained above, load balancing adds target analytes to the acquisition schedule as long as the scheduled acquisitions do not exceed the acquisition cycle period. However, in scenarios in which the elution peak width and, hence, the acquisition cycle period varies over time, as explained above for acquisition scheduling, the number of target analytes that can be added to the acquisition schedule will also vary over time. Accordingly, the number of target analytes that are included in the acquisition schedule can be further optimized by using a dynamic acquisition cycle period as described above. In some examples, the dynamic acquisition cycle period is determined based on analytes included in the sample, not a reduced (load balanced) set of target analytes. After the dynamic acquisition cycle period is determined, load balancing is performed to add the target analytes to the acquisition schedule. In other examples, a preliminary acquisition cycle period is used (constant or dynamic), load balancing is then performed to add target analytes to the acquisition schedule, and then the dynamic acquisition cycle period is determined based on the load balanced set of target analytes included in the acquisition schedule.

In yet further examples, some analyte groups may not be of interest to the user, so all analytes corresponding to these analyte groups may be excluded from the acquisition schedule.

Figure 15:
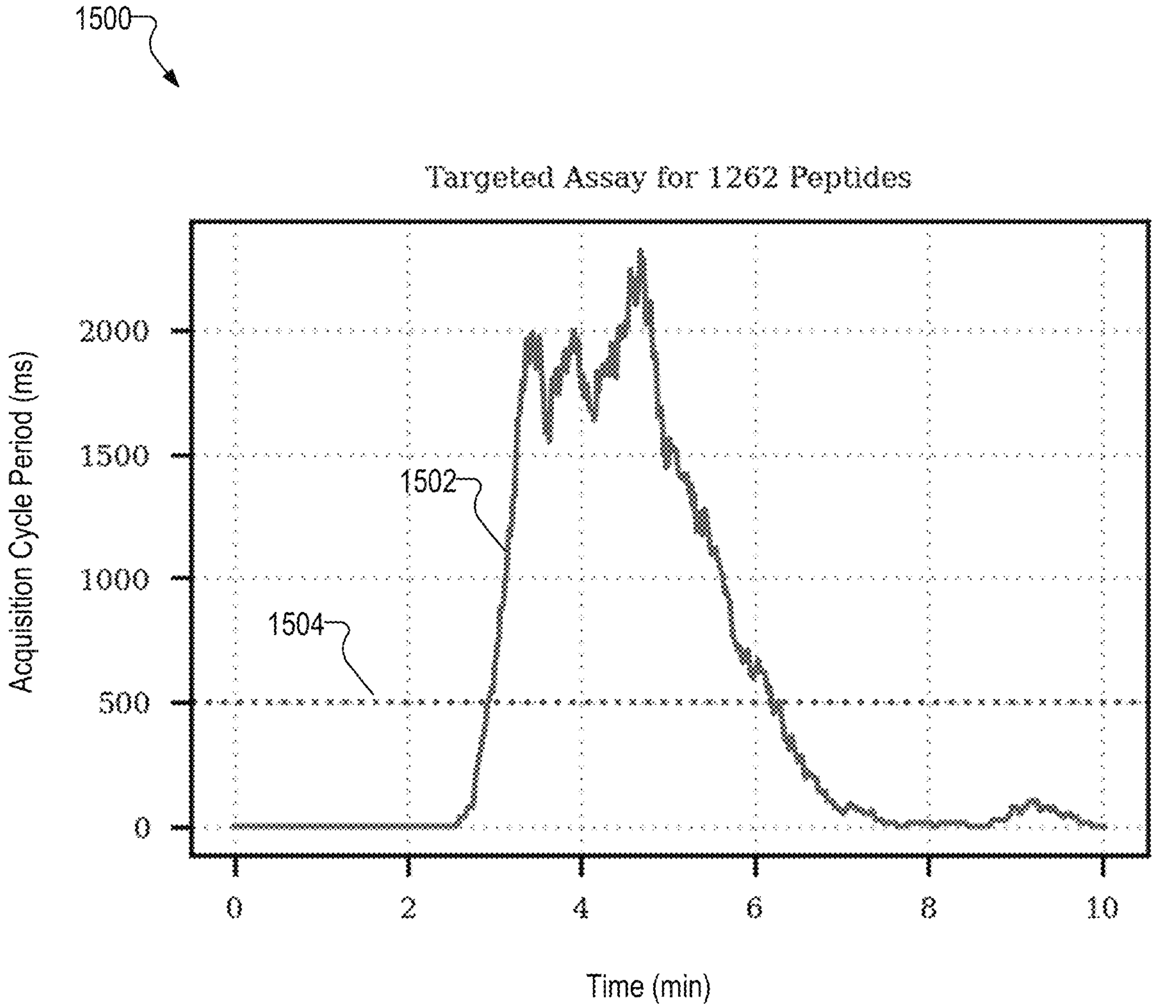
FIG. 15 shows a graph that includes a curve that represents the acquisition cycle period needed to sample all active peptides included in a sample as a function of elapsed time from an experiment initialization event.

To illustrate the load balancing technique, an illustrative example is considered with a set of 1,262 peptides identified in human plasma. FIG. 15 shows a graph 1500 that includes a curve 1502 that represents the acquisition cycle period needed to sample all active peptides included in the sample as a function of elapsed time from an experiment initialization event. If the mass spectrometer were to try to target all of the peptides (e.g., include all peptides in the acquisition schedule) without load balancing, the acquisition cycle period would far exceed a nominal acquisition cycle period of 500 ms required for 8 samples across a nominal peak width, as indicated by the dashed line 1504.

Figure 16:
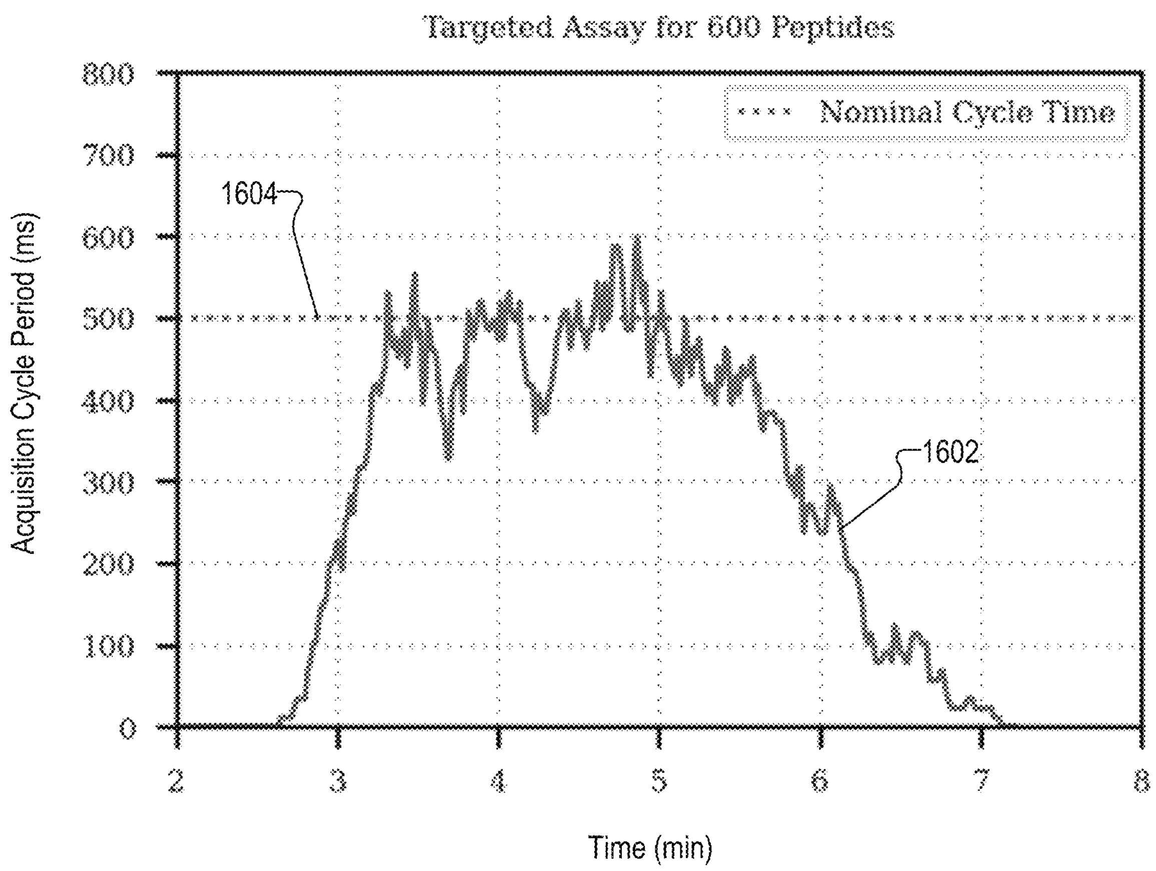
FIG. 16 shows a graph that includes a curve that represents the acquisition cycle period needed to sample all active peptides included in an acquisition schedule generated using load balancing as a function of elapsed time from an experiment initialization event.

FIG. 16 shows a graph 1600 that includes a curve 1602 that represents the acquisition cycle period needed to sample all active peptides included in the acquisition schedule as a function of elapsed time from an experiment initialization event. In the example of FIG. 16, the acquisition schedule is generated using the load balancing technique of method 1400 by organizing peptides into protein subsets and ranking peptides within each protein subset by the coefficient of variation of each peptide over 3 previous test replicates. As can be seen, the 1,262 potential target peptides are reduced to a smaller subset of about 600 target peptides that generally meet the criterion of a 500 ms acquisition cycle period, as shown by the dashed line 1604.

Figure 17:
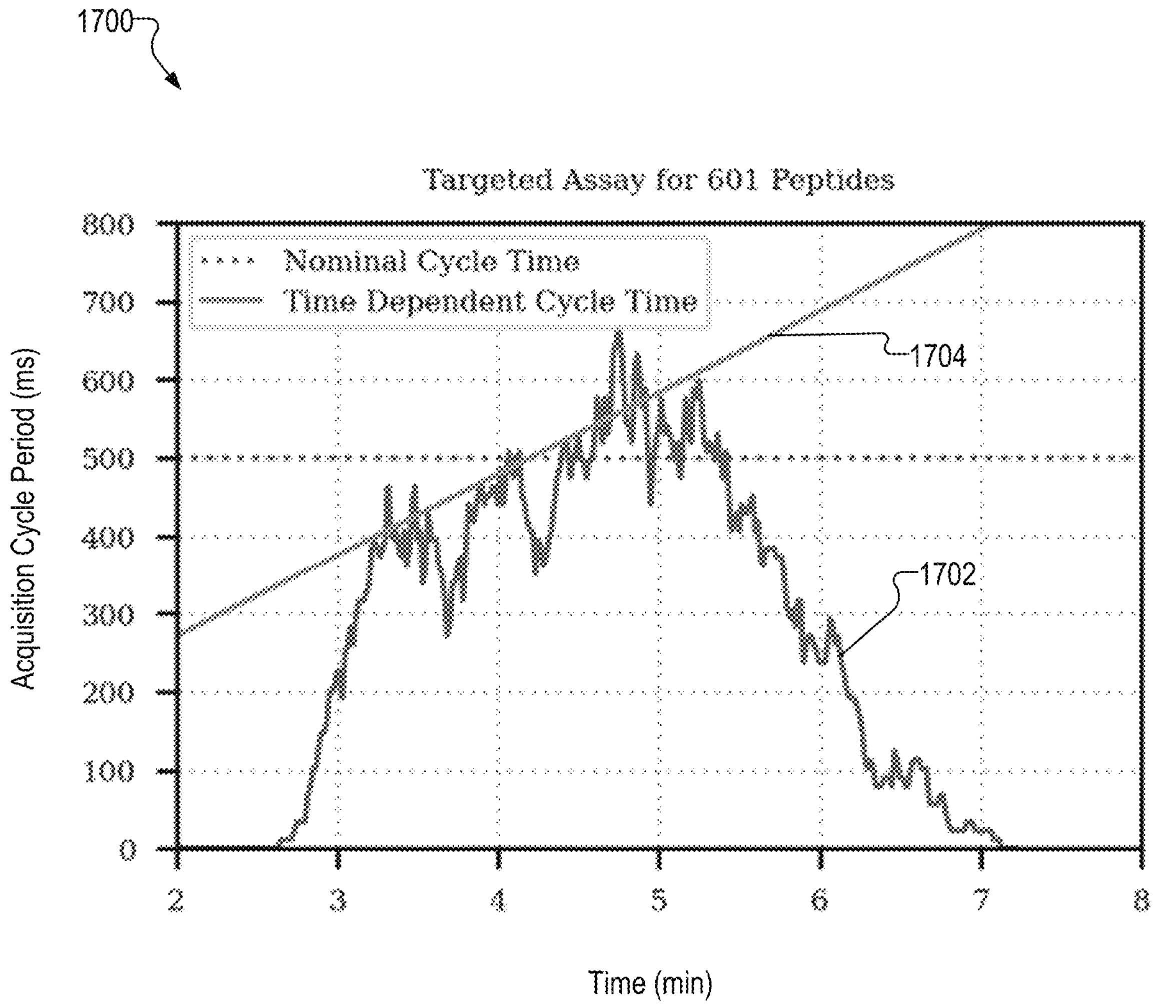
FIG. 17 shows a graph that includes a curve that represents a dynamic acquisition cycle period needed to sample all active peptides included in the acquisition schedule generated using load balancing as a function of elapsed time from an experiment initialization event.

Load balancing may also factor in the variation in elution peak width over time, as described above, to further optimize the acquisition schedule. FIG. 17 shows a graph 1700 that includes a curve 1702 that represents the acquisition cycle period needed to sample all active peptides included in the acquisition schedule as a function of elapsed time from an experiment initialization event. The same set of 1,262 peptides are reduced with the same load balancing technique as in FIG. 16 except that, in the example of FIG. 17, a time-dependent acquisition cycle period is introduced, as represented by line 1704, equivalent to acquisition of 8 points across the putative average elution peak width of the compounds eluting at any point in time. Although here the total number of target peptides in the assay is about the same as in the constant acquisition cycle period case (FIG. 16), the time-distribution of the target peptides included in the acquisition is not the same. In the example of FIG. 17, the target peptides included in the acquisition schedule are distributed in a way that better ensures that the required sampling rate is used at each time in the experiment.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 18:
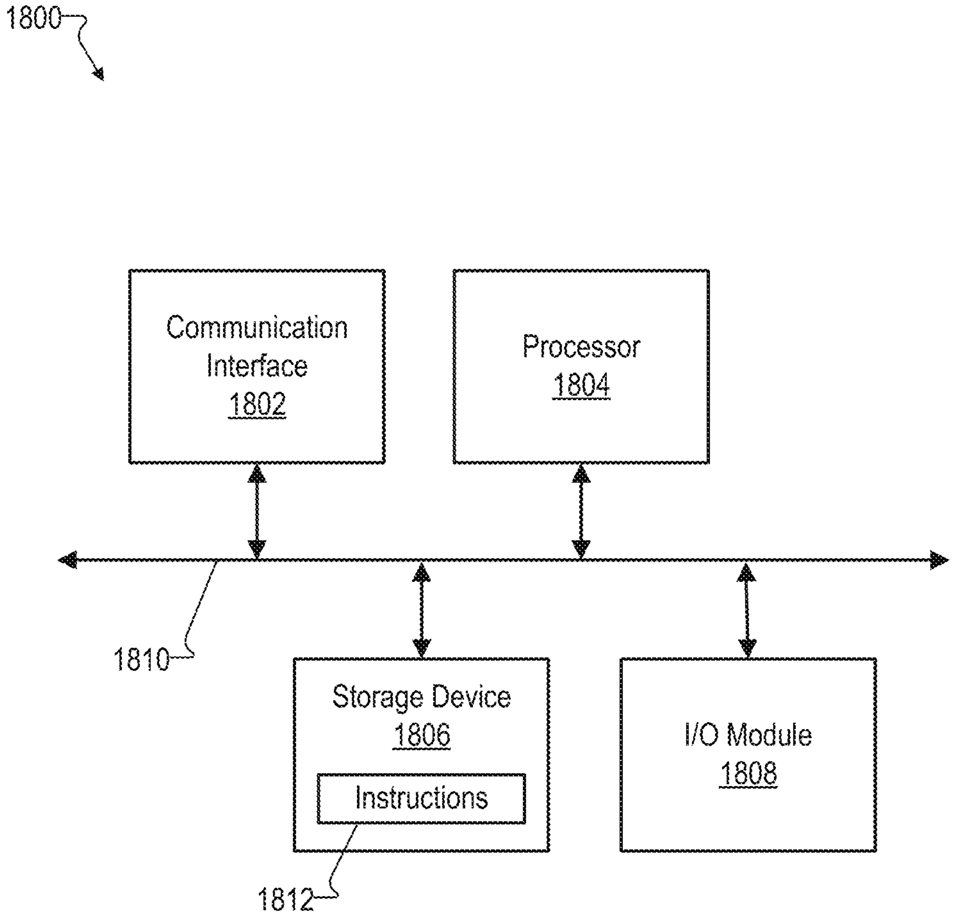
FIG. 18 shows a functional diagram of an illustrative computing device that may be specifically configured to perform one or more of the processes described herein.

FIG. 18 shows an illustrative computing device 1800 that may be specifically configured to perform one or more of the processes described herein. As shown in FIG. 18, computing device 1800 may include a communication interface 1802, a processor 1804, a storage device 1806, and an input/output ("I/O") module 1808 communicatively connected one to another via a communication infrastructure 1810. While an illustrative computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, an audio/video connection, and any other suitable interface.

Processor 1804 generally represents any type or form of processing unit capable of processing data and/or interpreting, executing, and/or directing execution of one or more of the instructions, processes, and/or operations described herein. Processor 1804 may perform operations by executing computer-executable instructions 1812 (e.g., an application, software, code, and/or other executable data instance) stored in storage device 1806.

Storage device 1806 may include one or more data storage media, devices, or configurations and may employ any type, form, and combination of data storage media and/or device. For example, storage device 1806 may include, but is not limited to, any combination of the non-volatile media and/or volatile media described herein. Electronic data, including data described herein, may be temporarily and/or permanently stored in storage device 1806. For example, data representative of computer-executable instructions 1812 configured to direct processor 1804 to perform any of the operations described herein may be stored within storage device 1806. In some examples, data may be arranged in one or more databases residing within storage device 1806.

I/O module 1808 may include one or more I/O modules configured to receive user input and provide user output. One or more I/O modules may be used to receive input for a single virtual experience. I/O module 1808 may include any hardware, firmware, software, or combination thereof supportive of input and output capabilities. For example, I/O module 1808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1800. For example, memory 602 may be implemented by storage device 1806, and processor 604 may be implemented by processor 1804.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

Advantages and features of the present disclosure can be further described by the following examples:

Example 1. A non-transitory computer-readable medium storing instructions that, when executed, direct at least one processor of a computing device for mass spectrometry to: generate an acquisition schedule that schedules acquisition, by a mass spectrometer, of a set of mass spectra for each target analyte included in a plurality of target analytes included in a sample as the plurality of target analytes elute from a separation system, wherein the acquisition schedule specifies a dynamic acquisition cycle period that varies over time; and direct the mass spectrometer to acquire the mass spectra in accordance with the acquisition schedule.

Example 2. The computer-readable medium of example 1, wherein the separation system comprises a capillary electrophoresis system.

Example 3. The computer-readable medium of example 1, wherein the acquisition cycle period is a function of time.

Example 4. The computer-readable medium of example 3, wherein generating the acquisition schedule comprises: fitting a curve to elution peak width data representative of expected elution times for target analytes included in the sample to generate an elution peak width function; and generating the acquisition cycle based on the elution peak width function and a sampling rate requirement.

Example 5. The computer-readable medium of example 4, wherein fitting the curve to the elution peak width data comprises determining a group elution peak width for each of a plurality of sets of co-eluting target analytes; and fitting the curve to the group elution peak width for each set of co-eluting target analytes.

Example 6. The computer-readable medium of example 5, wherein the group elution peak width of the plurality of analytes comprises a mean, a median, a minimum, or a maximum elution peak width.

Example 7. The computer-readable medium of example 1, wherein generating the acquisition schedule comprises: determining, based on elution peak width data representative of expected elution times for target analytes included in the sample, a group elution peak width for each of a plurality of sets of co-eluting target analytes; and setting the acquisition cycle period for each set of co-eluting target analytes based on the group elution peak width of each set of co-eluting target analytes and a sampling rate requirement.

Example 8. The computer-readable medium of example 1, wherein the acquisition schedule specifies an individual acquisition cycle period for each target analyte included in the acquisition schedule.

Example 9. The computer-readable medium of example 8, wherein generating the acquisition schedule comprises: determining, based on elution peak width data representative of expected elution times for a plurality of potential target analytes included in the sample, an individual elution peak width of each potential target analyte, wherein the plurality of potential target analytes includes each target analyte included in the acquisition schedule; and determining, based on the individual elution peak width of the potential target analyte and a sampling rate requirement, an individual acquisition cycle period for each potential target analyte; and including in the acquisition schedule the potential target analytes that fit in the acquisition schedule.

Example 10. A non-transitory computer-readable medium storing instructions that, when executed, direct at least one processor of a computing device for mass spectrometry to perform a process comprising: generating, for a targeted assay of a sample, an acquisition schedule that schedules acquisition, by a mass spectrometer, of a set of mass spectra for each target analyte included in a set of target analytes included in a sample as each target analyte elutes from a separation system, wherein generating the acquisition schedule comprises: identifying an analyte group corresponding to each analyte included in a list of analytes estimated to be present in the sample; and selecting, from the list of analytes, the set of target analytes based on selection criteria and the analyte group corresponding to each respective analyte included in the list of analytes; and directing the mass spectrometer to acquire the mass spectra in accordance with the acquisition schedule.

Example 11. The computer-readable medium of example 10, wherein the selection criteria specify a maximum number of analytes per analyte group that may be included in the acquisition schedule.

Example 12. The computer-readable medium of example 10, wherein the selection criteria specify an order for selecting target analytes to include in the acquisition schedule.

Example 13. The computer-readable medium of example 12, wherein selecting the set of target analytes based on the selection criteria comprises: sorting the list of analytes into a plurality of subsets of analytes, each subset of analytes corresponding to a distinct analyte group; ranking the analytes included in each subset of analytes based on a ranking parameter; and selecting, from each subset considered in turn, a highest ranking analyte to include in the set of target analytes.

Example 14. The computer-readable medium of example 13, wherein the ranking parameter comprises measured abundance of the respective analyte in one or more prior acquired mass spectra.

Example 15. The computer-readable medium of example 13, wherein the ranking parameter comprises a cross-correlation value of the respective analyte.

Example 16. The computer-readable medium of example 13, wherein the ranking parameter comprises a coefficient of variation of peak area over a plurality of replicate experiments for the respective analyte.

Example 17. The computer-readable medium of example 13, wherein the selection criteria further specify a maximum number of analytes per analyte group.

Example 18. The computer-readable medium of example 10, wherein: the acquisition schedule specifies an acquisition cycle period that varies over time; and selecting the set of target analytes is further based on the acquisition cycle period specified by the acquisition schedule and an acquisition speed of the mass spectrometer.

Example 19. A system for targeted mass spectrometry, comprising: a separation system configured to separate a plurality of target analytes included in a sample; a mass spectrometer coupled to the separation system and configured to acquire mass spectra for a set of target analytes included in the plurality of target analytes as the plurality of target analytes elute from the separation system; and a controller configured to: generate an acquisition schedule that schedules acquisition, by the mass spectrometer, of a set of mass spectra for each target analyte included in the set of target analytes, wherein the acquisition schedule specifies a dynamic acquisition cycle period that varies over time; and direct the mass spectrometer to acquire the set of mass spectra for the set of target analytes in accordance with the acquisition schedule.

Example 20. The system of example 19, wherein the separation system comprises a capillary electrophoresis system.

What is claimed is:

1. A non-transitory computer-readable medium storing instructions that, when executed, direct at least one processor of a computing device for mass spectrometry to:

generate an acquisition schedule that schedules acquisition, by a mass spectrometer, of a set of mass spectra for each target analyte included in a plurality of target analytes included in a sample as the plurality of target analytes elute from a separation system, wherein the acquisition schedule specifies an acquisition cycle period comprising a set time range wherein generating the acquisition schedule comprises:

identifying an analyte group corresponding to each analyte included in a list of analytes estimated to be present in the sample; and selecting, from the list of analytes, the set of target analytes based on selection criteria and the analyte group corresponding to each respective analyte included in the list of analytes, wherein the selection criteria specify an order for selecting target analytes to include in the acquisition schedule, wherein selecting the set of target analytes based on the selection criteria comprises:

sorting the list of analytes into a plurality of subsets of analytes, each subset of analytes corresponding to a distinct analyte group;

ranking the analytes included in each subset of analytes based on a ranking parameter; and selecting, from each subset considered in turn, a highest ranking analyte to include in the set of target analytes; and direct the mass spectrometer to acquire the mass spectra in accordance with the acquisition schedule.

2. The computer-readable medium of claim 1, wherein the separation system comprises a capillary electrophoresis system.

3. The computer-readable medium of claim 1, wherein the acquisition cycle period is a function of time.

4. The computer-readable medium of claim 3, wherein generating the acquisition schedule comprises:

fitting a curve to elution peak width data representative of expected elution times for target analytes included in the sample to generate an elution peak width function; and generating the acquisition cycle based on the elution peak width function and a sampling rate requirement.

5. The computer-readable medium of claim 4, wherein fitting the curve to the elution peak width data comprises determining a group elution peak width for each of a plurality of sets of co-eluting target analytes; and fitting the curve to the group elution peak width for each set of co-eluting target analytes.

6. The computer-readable medium of claim 5, wherein the group elution peak width of the plurality of analytes comprises a mean, a median, a minimum, or a maximum elution peak width.

7. The computer-readable medium of claim 1, wherein generating the acquisition schedule comprises:

determining, based on elution peak width data representative of expected elution times for target analytes included in the sample, a group elution peak width for each of a plurality of sets of co-eluting target analytes; and setting the acquisition cycle period for each set of co-eluting target analytes based on the group elution peak width of each set of co-eluting target analytes and a sampling rate requirement.

8. The computer-readable medium of claim 1, wherein the acquisition schedule specifies an individual acquisition cycle period for each target analyte included in the acquisition schedule.

9. The computer-readable medium of claim 8, wherein generating the acquisition schedule comprises:

determining, based on elution peak width data representative of expected elution times for a plurality of potential target analytes included in the sample, an individual elution peak width of each potential target analyte, wherein the plurality of potential target analytes includes each target analyte included in the acquisition schedule; and determining, based on the individual elution peak width of the potential target analyte and a sampling rate requirement, an individual acquisition cycle period for each potential target analyte; and including in the acquisition schedule the potential target analytes that fit in the acquisition schedule.

10. A non-transitory computer-readable medium storing instructions that, when executed, direct at least one processor of a computing device for mass spectrometry to perform a process comprising:

generating, for a targeted assay of a sample, an acquisition schedule that schedules acquisition, by a mass spectrometer, of a set of mass spectra for each target analyte included in a set of target analytes included in a sample as each target analyte elutes from a separation system, wherein generating the acquisition schedule comprises:

identifying an analyte group corresponding to each analyte included in a list of analytes estimated to be present in the sample; and selecting, from the list of analytes, the set of target analytes based on selection criteria and the analyte group corresponding to each respective analyte included in the list of analytes, wherein the selection criteria specify an order for selecting target analytes to include in the acquisition schedule, wherein selecting the set of target analytes based on the selection criteria comprises:

sorting the list of analytes into a plurality of subsets of analytes, each subset of analytes corresponding to a distinct analyte group;

ranking the analytes included in each subset of analytes based on a ranking parameter; and selecting, from each subset considered in turn, a highest ranking analyte to include in the set of target analytes; and directing the mass spectrometer to acquire the mass spectra in accordance with the acquisition schedule.

11. The computer-readable medium of claim 10, wherein the selection criteria specify a maximum number of analytes per analyte group that may be included in the acquisition schedule.

12. The computer-readable medium of claim 1, wherein the ranking parameter comprises measured abundance of the respective analyte in one or more prior acquired mass spectra.

13. The computer-readable medium of claim 1, wherein the ranking parameter comprises a cross-correlation value of the respective analyte.

14. The computer-readable medium of claim 1, wherein the ranking parameter comprises a coefficient of variation of peak area over a plurality of replicate experiments for the respective analyte.

15. The computer-readable medium of claim 1, wherein the selection criteria further specify a maximum number of analytes per analyte group.

16. The computer-readable medium of claim 10, wherein:

the acquisition schedule specifies an acquisition cycle period comprising a set time range; and selecting the set of target analytes is further based on the acquisition cycle period specified by the acquisition schedule and an acquisition speed of the mass spectrometer.

17. A system for targeted mass spectrometry, comprising:

a separation system configured to separate a plurality of target analytes included in a sample;

a mass spectrometer coupled to the separation system and configured to acquire mass spectra for a set of target analytes included in the plurality of target analytes as the plurality of target analytes elute from the separation system; and a controller configured to:

generate an acquisition schedule that schedules acquisition, by the mass spectrometer, of a set of mass spectra for each target analyte included in the set of target analytes, wherein the acquisition schedule specifies an acquisition cycle period comprising a set time range, wherein generating the acquisition schedule comprises:

identifying an analyte group corresponding to each analyte included in a list of analytes estimated to be present in the sample; and selecting, from the list of analytes, the set of target analytes based on selection criteria and the analyte group corresponding to each respective analyte included in the list of analytes, wherein the selection criteria specify an order for selecting target analytes to include in the acquisition schedule, wherein selecting the set of target analytes based on the selection criteria comprises:

sorting the list of analytes into a plurality of subsets of analytes, each subset of analytes corresponding to a distinct analyte group;

ranking the analytes included in each subset of analytes based on a ranking parameter; and selecting, from each subset considered in turn, a highest ranking analyte to include in the set of target analytes; and direct the mass spectrometer to acquire the set of mass spectra for the set of target analytes in accordance with the acquisition schedule.

18. The system of claim 17, wherein the separation system comprises a capillary electrophoresis system.

* * * * *